(12) United States Patent
Rishi et al.

(10) Patent No.: US 11,464,213 B2
(45) Date of Patent: Oct. 11, 2022

(54) DECISION MAKING SYSTEM AND METHOD OF FEEDING AQUATIC ANIMALS

(71) Applicant: OBSERVE TECHNOLOGIES LIMITED, Richmond (GB)

(72) Inventors: Hemang Ravi Rishi, Richmond (GB); Pieter Jan Fabry, London (GB); Ivan Makeev, London (GB); Charchris Sloan, London (GB)

(73) Assignee: OBSERVE TECHNOLOGIES LIMITED, Richmond (GB)

( * ) Notice: Subject to any disclaimer, the term of this patent is extended or adjusted under 35 U.S.C. 154(b) by 249 days.

(21) Appl. No.: 16/627,192

(22) PCT Filed: Jun. 28, 2018

(86) PCT No.: PCT/GB2018/051825
§ 371 (c)(1),
(2) Date: Dec. 27, 2019

(87) PCT Pub. No.: WO2019/002881
PCT Pub. Date: Jan. 3, 2019

(65) Prior Publication Data
US 2020/0170227 A1  Jun. 4, 2020

(30) Foreign Application Priority Data
Jun. 28, 2017 (GB) ...................... 1710372

(51) Int. Cl.
*A01K 61/80* (2017.01)
*A01K 61/13* (2017.01)
(Continued)

(52) U.S. Cl.
CPC .............. *A01K 61/80* (2017.01); *A01K 61/10* (2017.01); *A01K 61/13* (2017.01); *A01K 61/60* (2017.01);
(Continued)

(58) Field of Classification Search
None
See application file for complete search history.

(56) References Cited

U.S. PATENT DOCUMENTS 5,732,655 A   3/1998  Bab et al.
5,961,831 A * 10/1999  Lee ...................... A01K 63/042
                                                  119/260
(Continued)

FOREIGN PATENT DOCUMENTS

CN    105511346 A  *  4/2016
CN    106407711 A  *  2/2017   ......... G06F 19/3475
(Continued)

OTHER PUBLICATIONS

Isokawa et al., "TalkingNemo: Aquarium Fish Talks Its Mind for Breeding Support," ACM, 2016, 4pg. (Year: 2016).*

(Continued)

*Primary Examiner* — Ryan D. Coyer
(74) *Attorney, Agent, or Firm* — Finch & Maloney PLLC

(57) ABSTRACT

The present invention relates to a method and apparatus for providing a dynamic decision-making process in relation to feeding animals in water. More particularly, the present invention relates to a method and apparatus for improving feeding and/or farming strategies used in a fish farm. According to a first aspect, there is provided a computer-implemented method for feeding one or more aquatic animals, the method comprising the steps of: receiving pre-processed sensor data in relation to the one or more aquatic animals; inputting the pre-processed sensor data into one or more learned decision-making models, wherein the one or more learned decision-making models has been trained to substantially optimise the rate and amount of food provided to the aquatic animals; determining, by the one or more learned decision-making models using the received pre-processed sensor data, feeding instructions for the one or (Continued)

more aquatic animals; and outputting the feeding instructions from the one or more learned decision-making models.

19 Claims, 12 Drawing Sheets

(51) Int. Cl.
    *G06K 9/62* (2022.01)
    *G06N 3/04* (2006.01)
    *G06N 3/08* (2006.01)
    *G06T 7/20* (2017.01)
    *A01K 61/60* (2017.01)
    *A01K 61/10* (2017.01)
    *G06N 20/00* (2019.01)
    *G06V 40/20* (2022.01)

(52) U.S. Cl.
    CPC ............ *G06K 9/6262* (2013.01); *G06N 3/04* (2013.01); *G06N 3/08* (2013.01); *G06N 20/00* (2019.01); *G06T 7/20* (2013.01); *G06V 40/20* (2022.01); *G06T 2207/10016* (2013.01); *G06T 2207/20081* (2013.01); *G06T 2207/20084* (2013.01)

(56) References Cited

U.S. PATENT DOCUMENTS

| | | | | |
|---|---|---|---|---|
| 6,000,362 | A | 12/1999 | Blyth et al. | |
| 6,510,815 | B1 * | 1/2003 | Lagardere | A01K 61/80 119/230 |
| 9,924,700 | B1 * | 3/2018 | Kuper | H04W 4/02 |
| 10,653,110 | B2 * | 5/2020 | Pfeiff | H02P 1/18 |
| 2020/0113158 | A1 | 4/2020 | Rishi et al. | |

FOREIGN PATENT DOCUMENTS

| | | | | |
|---|---|---|---|---|
| CN | 108575788 | A * | 9/2018 | |
| DE | 4224750 | A1 | 2/1994 | |
| DE | 102016114137 | B3 * | 8/2017 | |
| EP | 2178362 | A1 | 4/2010 | |
| EP | 2923567 | A1 * | 9/2015 | ............... A01K 5/02 |
| EP | 2178362 | B1 * | 11/2016 | ........... A01K 61/001 |
| JP | 2019153302 | A * | 9/2019 | ............. A01K 61/80 |
| SE | 9804384 | A0 | 6/2000 | |
| WO | 9749279 | A1 | 12/1997 | |
| WO | 2009008733 | A1 | 1/2009 | |
| WO | 2011089007 | A2 | 7/2011 | |
| WO | 2012083461 | A1 | 6/2012 | |
| WO | 2016023071 | A1 | 2/2016 | |
| WO | 2016056923 | A1 | 4/2016 | |
| WO | WO-2016181604 | A1 * | 11/2016 | ........... A01K 11/004 |
| WO | 2017119821 | A1 | 7/2017 | |
| WO | WO-2017132690 | A1 * | 8/2017 | ........... A61B 5/0022 |
| WO | 2017197129 | A1 | 11/2017 | |
| WO | 2019002880 | A1 | 1/2019 | |
| WO | 2019002881 | A1 | 1/2019 | |

OTHER PUBLICATIONS

Zion, Boaz, "The use of computer vision technologies in aquaculture—A review," Elsevier, 2012, 8pg. (Year: 2012).*
European Examination Report pursuant to Article 94(3) received for EP Application No. 18739604.9, dated Jan. 19, 2022. 6 pages.
International Search Report and Written Opinion received for PCT Application No. PCT/GB2018/051824, dated Sep. 21, 2018. 15 pages.
International Preliminary Report on Patentability received for PCT Application No. PCT/GB2018/051824, dated Sep. 13, 2019, 10 pages.
International Search Report and Written Opinion received for PCT Application No. PCT/GB2018/051825, dated Sep. 21, 2018. 12 pages.
International Preliminary Report on Patentability received for PCT Application No. PCT/GB2018/051825, dated Sep. 13, 2019, 10 pages.

* cited by examiner

DECISION MAKING SYSTEM AND METHOD OF FEEDING AQUATIC ANIMALS

FIELD

The present invention relates to a method and apparatus for providing a dynamic decision-making process in relation to feeding animals in water. More particularly, the present invention relates to a method and apparatus for improving feeding and/or farming strategies used in a fish farm.

BACKGROUND

Now that most wild capture fisheries are at or even above sustainable levels, interest in aquaculture, or fish farming, is increasing. Despite rapid expansion in recent decades, aquaculture is still expected to grow by nearly 40% by 2025. However, in many cases the most suitable sites for fish farms have already been utilised so further expansion cannot be met simply by opening more farms.

Fish farming ideally requires fish to be fed the optimum amount of food, for example at as close to optimal times between feeds and of as close to the optimal duration of feeding and providing as close to the optimal amounts of food each time the fish are fed over the duration of each feed. Fish are typically fed with food pellets that are dropped into the enclosed areas in which each shoal of fish are farmed. It is probably not possible to identify the absolutely ideal optimal values; for example, for the times between feeds, duration of feeding or number of pellets to be provided during each feed; but it is desired to get as close to these optimal values as possible through the implementation of a more efficient feeding strategy.

Feeding the fish too regularly, feeding the fish too many pellets during a feed, feeding the fish for too long a duration, or feeding the fish at the wrong time(s) of day will result in wasted pellets. Inefficient strategies may result in feed waste collecting underneath the fish and potentially attracting undesirable algae or other marine life and/or restricting the maximisation of fish growth and/or changing the properties of the surrounding ocean.

Inefficient feeding strategies result in a less commercially efficient and a more cost consuming fish farming operation.

It has been attempted to determine optimal strategies for small- and large-scale fish farms, but current methods are unreliable and cannot be readily modified, manually and/or automatically, to be tailored for individual cages and/or fish farms.

Consequently, there is a need to improve the efficiency of fish farming as most of the feeding strategies employed in fish farms are manually developed and implemented by their operators, typically resulting in inefficient strategies being used and/or inefficient implementation.

SUMMARY OF INVENTION

According to a first aspect, there is provided a computer-implemented method for feeding one or more aquatic animals, the method comprising the steps of: receiving pre-processed sensor data in relation to the one or more aquatic animals; inputting the pre-processed sensor data into one or more learned decision-making models, wherein the one or more learned decision-making models has been trained to substantially optimise the rate and amount of food provided to the aquatic animals; determining, by the one or more learned decision-making models using the received pre-processed sensor data, feeding instructions for the one or more aquatic animals; and outputting the feeding instructions from the one or more learned decision-making models.

Making improvements to a feeding or farming strategy may have environmental benefits as well as economic ones. Farmers thus seek to feed the fish as much as possible to accelerate growth by optimising for feed conversion ratio and standard growth rate, but have to balance this against wasting feed through the implementation of effective feeding strategies, that is by utilising pre-processed information to improve the feeding algorithm and/or decision-making model.

Optionally, the feeding of the one or more aquatic animals takes place in a confined space containing water; optionally wherein the one or more enclosed spaces comprise one or more cages and/or one or more aquatic animal farms.

Optionally, the one or more learned decision-making models comprises one or more loss and/or reward functions: optionally wherein the loss/reward function minimises/maximises one or more signals, further optionally wherein the one or more signals comprises pre-processed sensor data; and/or optionally wherein a gaussian distributed model and/or a linearly distributed model is used prior to the use of a loss/reward function. optionally wherein the one or more signals comprises: image data; video data; acoustic data; sonar data; light data; biomass data; environmental data; stereo vision data; acoustic camera data; and/or fish activity data: optionally wherein said pre-processed sensor data comprises any or a combination of: fish type; feed type; past and present feed conversion ratio; biological feed conversion ratio; economical feed conversion ratio; past and present standard growth rate; past and present specific growth rate; mortality data; feed input data comprising amount and/or rate and/or intensity; optionally wherein said fish activity data comprises any or a combination of: reaction of fish towards feed; fish schooling data; surface feeding activity; fish density; fish speed; and/or distance of fish from sensors; dissolved oxygen level; state of the tide; pH of the water; visibility through the water; intensity of light incident on the water; biomass data; mass of feed being consumed; air and/or water temperature; sunlight; cleanliness of water; salinity; saturation; rainfall; tide level; state of nets; treatments; sea lice count; oxygen input data; current or wind data; fish genetic data; metabolic rate; sound of fish eating; sound of fish moving; and/or fish vaccination.

To help ensure the profitability of raising animals for a farmer, particularly in relation to farmed fish, it can be important to minimise feed wastage. Wasted feed does not contribute to the growth of the fish, which is ultimately why fish are conventionally farmed. Wasted feed may also collect underneath the fish being farmed. The wasted feed that has collected can then decay, encouraging undesirable microbial growth, smothering existing marine ecosystems, and depriving local volumes of water of the oxygen required for the fish to remain healthy. Any chemicals or antibiotics in the feed which settle on the ground may leak into the ecosystem, and cause undesirable effects including tumours, lesions and parasites in aquatic animals local to the fish farm. Therefore, it is desirable to minimise the amount of feed wasted by providing as close to the precise amount of feed required to encourage optimal growth of the fish. Any excess feed is liable to pass uneaten through the fish feeding area and be wasted. A "loss" function can be an efficient way to optimise a particular goal, for example reducing the overall cost of feed and decreasing the feed conversion ratio. The feed conversion ratio refers to the amount of feed inputted as kg to the growth in fish in kg.

Optionally, the one or more learned decision-making models comprises one or more temporal feedback loops. Optionally, the one or more temporal feedback loops maximises the amount of food put into the cage against a loss function.

By using unsupervised iterative learning algorithms, a feeding recommendation can be tailored and modified to each individual fish cage on a farm site.

Optionally, the one or more learned decision-making models are based on Linear Time-Invariant (LTI)/classical control theory feedback loop by generalizing models into a linear domain about specific points in the feature vector.

The system may be controlled by describing the model as a Linear-Time Invariant system (LTI). The model may be improved by incorporating further signal processing techniques to define an estimator as a linear or non-linear system of differential equations for the next state of the system given an initial state. The model may be improved by incorporating further signal processing techniques to define an estimator as a linear system of differential equations for the next state of the system given an initial state. In the case of a non-linear system modelling, a dynamically trained approximation about defined regimes is used to generalize a system. The outputs of this estimator will then be used to define a controller. This controller will then be used to control the state of the system so to reduce a defined error term. This error term can be the number of pellets seen, biomass growth, FCR, SGR or any other loss function provided the time horizon of that feature estimation is sufficiently accurate. A filter (such as a moving average filter or an ARMA filter) may be used to first smooth the underlining signals, such as number of fish on the screen, the speed of the fish, and other outputs of the vision system in order to reduce noise appropriately.

Other features which may be selected in optimizing a feeding/automatic strategy include live feed data; depth of camera; acoustic data; sonar data; light data; biomass data; environmental data; stereo vision data; acoustic camera data; and/or fish activity data; fish type; feed type; past and present feed conversion ratio; biological feed conversion ratio; economical feed conversion ratio; past and present standard growth rate; past and present specific growth rate; mortality data; feed input data comprising amount and/or rate and/or intensity; reaction of fish towards feed; fish schooling data; surface feeding activity; fish density; fish speed; and/or distance of fish from sensors; dissolved oxygen level; state of the tide; pH of the water; visibility through the water; intensity of light incident on the water; biomass data; mass of feed being consumed; air and/or water temperature; sunlight; cleanliness of water; salinity; saturation; rainfall; tide level; state of nets; treatments; sea lice count; oxygen input data; current or wind data; fish genetic data; and/or fish vaccination etc. in order to predict future fish activity and/or variables.

Optionally, the feeding instructions are generated through correlation analysis of the pre-processed sensor data comprising one or more analysis in relation to any or any combination of: feed provided to the one or more aquatic animals; activity level of the one or more aquatic animals; wasted feed pellets; mortality data; treatment data; genetic data; and/or environmental data. Optionally, the pre-processing of the pre-processed sensor data comprises filtering and/or normalization techniques.

A combination of features may be backed up continuously in the cloud. These may include 1) Activity Features—how close the fish are to the camera, how they are schooling, distance of fish from surface, speed of fish, density of fish, placement of fish within a cage, age of fish, size of fish, sonar and acoustic datapoints. These features are trained as a linear regression of data points from the farm site, and are normalized and scaled into a range 0-10. 2) Pellet Features—the number of pellets identified, the number of waste objects such as fish waste/faeces, and water waste objects such as seaweeds floating etc. 3) Feeding Data—how much food was provided to the fish, when the food was provided, fish biomass, fish mortality rates and reasons for such rates. 4) Auxiliary sensor data—current, tide, wind, pH, sunlight, oxygen, temperature, salinity, turbidity, rain, biomass data, fish mortalities, algae sensor data etc.

Optionally, the correlation analysis is performed using one or more machine learning algorithms: optionally wherein the one or more machine learning algorithms comprise one or more reinforcement learning algorithms; further wherein one or more input correlation vectors comprises a normalised mean and a normalised variance; further wherein the normalized mean and the normalized variance are normalized using one or more hyper parameter functions.

Unsupervised learning does not require the presentation of correct input and output pairs as with conventional machine learning. Reinforcement learning is a form of unsupervised learning where the balance is developed between the exploitation of known data and the exploration of unknown information, making reinforcement learning particularly suited to problems which include long term versus short term rewards. Additionally, anomaly detection is a form of unsupervised learning whereby anomalies in data is identified. By monitoring the activity level over a plurality of individual frames, more data may be gathered and, in this way, a more accurate model may be generated.

Optionally, the one or more learned decision-making models further comprises one or more signal processing techniques: optionally wherein the one or more signal processing techniques comprises a Long Short Term Memory (LSTM) model; Suport Vector Machine (SVM) model; Gated Recurrent Unit (GRU); linear regression; Recurrent Neural Network (RNN); and/or a random forest model.

Optionally, the one or more learned decision-making models comprises an estimator model: optionally wherein the estimator model comprises a moving average filter and/or a multivariate regression and/or a polynomial regression. Optionally wherein the estimator model preprocesses data via a moving average filter. Optionally, an estimator model may comprise of a LSTM/RNN/GRU architecture. Optionally, an estimator model may comprise of a Random Forest architecture. Optionally, an estimator may be polynomial regression. Optionally, an estimator may be modelled via a set of differential equations and/or the estimator model is used to predict what a signal for a time horizon.

An estimator for each signal may be designed so to 'describe' the state of the world. An estimator may be used to perform time-series prediction for different features extracted. For example, an estimator may be made to use existing features to predict the onset of pellets within a time horizon. Each feature may have a different underlining estimator model, where model suitability is determined based on model accuracy. An estimator may preprocess data. This could be a combination of ARMA, or other types of moving average filters for signal noise reduction. A differential equation representation of the future state of the system can be modelled from the data. Traditional modeling, multivariate polynomial regression and machine learning techniques may also be used to model the estimator. Similarly, a LSTM, random forest or neural network approach may be used to approximate the next state of the system.

Training of machine learning models is done over a 'sliding window' of the data from input to output, where the size of the sliding window is a hyperparameter of the system.

Optionally, the one or more learned decision-making models is updated using reinforcement learning techniques and/or time series analysis: optionally wherein the time series analysis considers any one or more of feed score over time, monthly diseases and/or other combination of factors which led to previous disease outbreaks.

In order to understand long term historic behaviours/other environmental factors and take this available data into account in strategic farming, time series analysis may be performed to integrate into feeding recommendation by taking past data into account.

Optionally, the one or more learned decision-making models further outputs one or more predictions comprising any one or more of: oncoming of pellets; bad activity; bad schooling; distance of the aquatic animals from the camera; speed of the aquatic animals overfeeding; and/or underfeed. Optionally each of the one or more predictions comprises one or more potential loss candidates. Optionally the one or more predictions is dependent on a time horizon of the one or more potential loss candidates.

The predictions can be fed back into the local machine based locally on a farming site such that the local AI can be capable of warning users of these predictions and even recommend alternate one or more feeding practices to maintain effective and efficient fish development.

Optionally, the one or more learned decision-making models further comprises an anomaly detection algorithm: optionally wherein the anomaly detection algorithm takes into account factors relating to oncoming diseases, historic health data and/or high sea lice count over time.

Health monitoring and detecting health problems at early stages can play a vital role in fish farming in general and also in determining fish feeding arrangements. In order to ascertain anomalies within fish farms, features similar to the estimation and optimization algorithms may be implemented in an anomaly detection algorithm. Anomalies include factors relating to oncoming diseases and/or high sea lice count over time. Using AI techniques, anomaly detection algorithms may be provided in the form of unsupervised learning tasks executed from the structuring of various data. By looking at trends in data and analysing past historic data, factors relating to health hazards can be determined and mitigated. The anomaly detection can be done by constructing a model from 'standard' or 'normal' behavior from a given normal training data set, and then testing the likelihood of a new data point as being a subset of the 'normal' behavior. Another approach would be to 'duster' the data, then checking any new data to determine if the new data is sufficiently far from the duster according to some heuristic function to indicate it that the new data is not "normal".

Therefore, it can be advantageous for a farmer to be informed of such events as soon as possible, for example through the use of an alarm system, in order to mitigate the negative effects. Any alarms (also referred to as alerts) may be stored in a cloud server or locally, and may, for example, provide information relating to feeding patterns and graphs of previously supplied recommendations to maximise efficient running of farms in the future. Information may also be stored and provided in relation to actions that a farmer took, which can be advantageous to management-level employees when running a fish farm. Such data storage, retrieval, and supply for future use may be applied to any data recorded or created via processing through the use of the apparatus or method or system disclosed herein.

Optionally, the one or more learned decision-making models is updated over a period of time and/or arranged to continuously learn in real time: optionally wherein the model is arranged to continuously learn in real time through on-site strategies and/or cloud learning strategies.

By dynamically updating the model over a time period, for example individual feeding cycles at orders of magnitude ranging from 2 to 4, a more accurate model may be developed by incorporating new learned information and hence less feed may be wasted in the future.

If the farm is in a remote location and may lack a reliable connection to an off-site computer processing facility, it may be more efficient and/or reliable to perform the computer-implemented steps locally. Typically, the sample frames and recorded data referred to above will be uploaded to the cloud during the night when no feeding is occurring (and there is plenty of time to compensate for the poor data rate). Offline processing may then be conducted in the cloud to improve the learned model.

Optionally, the computer-implemented method further comprises the step of: showing data regarding the one or more aquatic animals to an operator via a user interface; optionally wherein the user interface is operable to display any or any combination of: feed intensity score; feed pellets not consumed by the one or more aquatic animals; a derived amount of feed; a rate at which feed should be provided; feeding pellets not consumed; feed conversion rate; biomass; animal mortality; animal growth; instructing placement of a derived amount of feed; and/or animal activity.

A user interface, for example in the form of a dynamic bar, can provide useful information to farmers in a more convenient manner. Pictures may be provided as evidence to a farmer as to why certain conclusions were reached and/or why certain decisions were recommended. The farmer may then be able to act more effectively and efficiently when managing the farm. Data, for example regarding negatively impactful feeding patterns and interpretation of the results of analysis from the learned decision-making model and/or a learned function (F(x)) used, may be transmitted to a farmer or manager. Such transmission may be via the Internet and can provide useful information regarding future decisions to be made. Signalling directly to a feed distribution apparatus can provide a level of automation to the farm, wherein feed can be provided automatically where it is required.

Optionally, the data regarding the one or more aquatic animals is transmitted to an operator via the Internet. Optionally, instructing placement of the derived amount of feed comprises displaying the amount on a user interface: optionally wherein instructing placement of the derived amount of feed comprises instructing placement directly to a control feed apparatus; and/or optionally other automatic controls around the one or more cages and/or the one or more fish farms. Optionally, the step of determining the amount of feed to be provided to the one or more aquatic animals comprises deriving a rate at which the feed should be provided.

Optionally, further comprising the step of: triggering an alarm in response to a detection of one or more of: the feeding process being wrong; detected levels of dissolved oxygen dropping; the presence of other species of animal in the confined space, detected health anomalies, and/or detected net holes.

Using AI, anomaly detection algorithms may be in the form of unsupervised learning tasks executed from the structuring of various data. By looking at trends in data and analysing past historic data, factors relating to health hazards can be determined and mitigated. Therefore, it can be advantageous for a farmer to be informed of such events as soon as possible, for example through the use of an alarm system, in order to mitigate the negative effects. Any alarms (also referred to as alerts) may be stored in a cloud server or locally, and may, for example, provide information relating to feeding patterns and graphs of previously supplied recommendations to maximise efficient running of farms in the future. Information may also be stored and provided in relation to actions that a farmer took, which can be advantageous to management-level employees when running a fish farm. Such data storage, retrieval, and supply for future use may be applied to any data recorded or created via processing through the use of the apparatus or method or system disclosed herein.

According to a second aspect, there is provided an apparatus operable to perform the method of any preceding claim; optionally wherein the one or more learned decision-making models are substantially implemented on a graphical processing unit; and/or optionally wherein the method is performed substantially locally to where the aquatic animals are located; and/or optionally wherein the apparatus comprises any or any combination of: an input; a memory; a processor; and an output.

According to a third aspect, there is provided a system operable to perform the method of any preceding claim; optionally wherein the system is operable to instruct placement of feed by signalling to feed distribution apparatus.

According to a fourth aspect, there is provided a computer program product operable to perform the method and/or apparatus and/or system of any preceding claim.

According to a further aspect, there is provided a computer-implemented method for determining an amount of feed to be provided to one or more aquatic animals, the method comprising the steps of: receiving pre-processed sensor data in relation to the one or more aquatic animals; implementing a learned model, wherein the learned model is responsive to the pre-processed sensor data; generating an output comprising an optimised level of feed to provide to the one or more aquatic animals.

Optionally, the feeding of the one or more aquatic animals takes place in a confined space containing water. Optionally, the learned model comprises one or more loss and/or reward functions: optionally wherein the loss/reward function minimises/maximises one or more signals; and/or optionally wherein a gaussian distributed model and/or a linearly distributed model is used prior to the use of a loss/reward function.

To help ensure the profitability of raising animals for a farmer, particularly in relation to farmed fish, it can be important to minimise feed wastage. Wasted feed does not contribute to the growth of the fish, which is ultimately why fish are conventionally farmed. Wasted feed may also collect underneath the fish being farmed. The wasted feed that has collected can then decay, encouraging undesirable microbial growth, smothering existing marine ecosystems, and depriving local volumes of water of the oxygen required for the fish to remain healthy. Any chemicals or antibiotics in the feed which settle on the ground may leak into the ecosystem, and cause undesirable effects including tumours, lesions and parasites in aquatic animals local to the fish farm. Therefore, it is desirable to minimise the amount of feed wasted by providing as close to the precise amount of feed required to encourage optimal growth of the fish. Any excess feed is liable to pass uneaten through the fish feeding area and be wasted. A "loss" function can be an efficient way to optimise a particular goal, for example reducing the overall cost of feed and decreasing the feed conversion ratio. The feed conversion ratio refers to the amount of feed inputted as kg to the growth in fish in kg.

Optionally, further comprising a step of performing correlation analysis. Optionally, the correlation analysis is performed using one or more reinforcement learning algorithms: optionally wherein one or more input correlation vectors comprises a normalised mean and a normalised variance, further wherein the normalised mean and the normalised variance are normalised using one or more hyper parameter functions; optionally wherein the correlation analysis is performed using linear regression and/or random forests.

Reinforcement learning does not require the presentation of correct input and output pairs as with conventional machine learning. Instead a balance is developed between the exploitation of known data and the exploration of unknown information, making reinforcement learning particularly suited to problems which include long term versus short term rewards. By monitoring the activity level over a plurality of individual image frames, more data is gathered and hence a more accurate model may be generated.

Optionally, the learned model further comprises one or more signal processing techniques: optionally wherein the one or more signal processing techniques comprises a Long Short Term Memory (LSTM) model and/or a random forest model. Optionally, the learned model defines an estimator: optionally wherein the estimator comprises a moving average filter and/or a multivariate regression.

The model may be improved by incorporating further signal processing techniques to define an estimator (such as an LSTM model) for the next state of the system given an initial state. The outputs of this estimator will then be used to define a controller. This controller will then be used to control the state of the system so to reduce the number of pellets seen. A filter may be used to first smooth the underlining signals, such as number of fish on the screen, the speed of the fish, and other outputs of the vision system in order to reduce noise. An estimator for each signal may be designed so to 'describe' the state of the world. This could be a combination of ARMA, or other types of moving average filters, with multivariate regression. A custom polynomial/easily differentiable multi-variate ARMA-type model can be fit from obtained data.

Optionally, the model is updated over a time period. Optionally, the learned model is arranged to continuously learn in real time: optionally wherein the model is arranged to continuously learn in real time through on-site strategies and/or cloud learning strategies.

By dynamically updating the model over a time period, for example 10 individual feeding cycles, a more accurate model may be developed by incorporating new learned information and hence less feed may be wasted in the future.

Optionally, the learned model is updated using reinforcement learning techniques and/or classical control theory with time series analysis: optionally wherein the time series analysis considers any one or more of feed score over time, monthly diseases and/or other combination of factors which led to previous disease outbreaks.

Health monitoring and detecting health problems at early stages can play a vital role in fish farming in general and also in determining fish feeding arrangements. In order to ascertain anomalies within fish farms, features similar to the RL algorithm may be implemented in an anomaly detection algorithm. Anomalies include factors relating to oncoming diseases and/or high sea lice count over time. Using AI, anomaly detection algorithms may be in the form of unsupervised learning tasks executed from the structuring of various data. By looking at trends in data and analysing past historic data, factors relating to health hazards can be determined and mitigated.

Optionally, the learned model further comprises an anomaly detection algorithm: optionally wherein the anomaly detection algorithm takes into account factors relating to oncoming diseases, historic health data and/or high sea lice count over time.

If the farm is in a remote location and so may lack a reliable connection to an off-site computer processing facility, it may be more efficient and/or reliable to perform the computer-implemented steps locally. Typically, the sample frames and recorded data referred to above will be uploaded to the cloud during the night when no feeding is occurring (and there is plenty of time to compensate for the poor data rate). Offline processing may then be conducted in the cloud to improve the learned model.

Optionally, data regarding the animals is shown to an operator via a user interface (UI). Optionally, the data regarding the animals includes data relating to one or more of: feeding pellets not consumed, animal mortality, instructing placement of the derived amount of feed, and/or animal activity. Optionally, data regarding the animals is transmitted to an operator via the Internet. Optionally, instructing placement of the derived amount of feed comprises displaying the amount on a user interface. Optionally, instructing placement of the derived amount of feed comprises signalling to feed distribution apparatus.

A user interface, for example in the form of a dynamic bar, can provide useful information to farmers in a more convenient manner. Pictures may be provided as evidence to a farmer as to why certain conclusions were reached and/or why certain decisions were recommended. The farmer may then be able to act more effectively and efficiently when managing the farm. Data, for example regarding negatively impactful feeding patterns and interpretation of the results of analysis from CNNs and/or a function F(x) used, may be transmitted to for example a farmer or manager. Such transmission may be via the Internet and can provide useful information regarding future decisions to be made. Signalling directly to a feed distribution apparatus can provide a level of automation to the farm, wherein feed can be provided automatically where it is required.

Optionally, the step of deriving the amount of feed to be provided to the one or more aquatic animals further comprises deriving a rate at which the feed should be provided.

Feeding the fish too quickly is likely to result in waste of feed.

Optionally, the method further comprises the step of triggering an alarm in response to at least one of the feeding process being wrong, detected levels of dissolved oxygen dropping, and/or the presence of other species of animal in the confined space.

Detection of anomalies may also alert the farmer, for example, as over a period of time patterns can be understood and if certain activity is unusual based on various factors such as variance from the understood pattern(s) then an alarm may be triggered.

Health monitoring and detecting health problems at early stages can play a vital role in fish farming in general and also in determining fish feeding arrangements. In order to ascertain anomalies within fish farms, features similar to the RL algorithm may be implemented in an anomaly detection algorithm. Anomalies include factors relating to oncoming diseases and/or high sea lice count over time. Using AI, anomaly detection algorithms may be in the form of unsupervised learning tasks executed from the structuring of various data. By looking at trends in data and analysing past historic data, factors relating to health hazards can be determined and mitigated. Therefore, it can be advantageous for a farmer to be informed of such events as soon as possible, for example through the use of an alarm system, in order to mitigate the negative effects. Any alarms (also referred to as alerts) may be stored in a cloud server or locally, and may, for example, provide information relating to feeding patterns and graphs of previously supplied recommendations to maximise efficient running of farms in the future. Information may also be stored and provided in relation to actions that a farmer took, which can be advantageous to management-level employees when running a fish farm. Such data storage, retrieval, and supply for future use may be applied to any data recorded or created via processing through the use of the apparatus or method or system disclosed herein.

According to a further aspect, there is provided an apparatus operable to perform the method of any preceding feature.

According to a further aspect, there is provided a system operable to perform the method of any preceding feature.

According to a further aspect, there is provided a computer program operable to perform the method and/or apparatus and/or system of any preceding feature.

BRIEF DESCRIPTION OF DRAWINGS

The present invention will now be described, by way of example, with reference to the accompanying drawings, in which.

SPECIFIC DESCRIPTION

The following embodiment focusses on salmon farming, but the techniques disclosed are applicable in other embodiments to all water-based animals, including crustaceans and particularly finfish (that is fish with spines and fins such as sea bass and tilapia, besides salmon).

It has been estimated that a favourable level of feeding i.e. effective feeding and/or farming strategies can add around £32,000 per site to the value of stock in a typical fish farm per day. Inexperience or inattention from the farmer can reduce this amount significantly with clear and dramatic economic consequences. As for strategic feeding, information from fish feed companies typically suggests somewhat smaller amounts of feed than can actually be consumed by the fish. All of this results in most farming processes being less efficient than expected. Additionally, if the fish take longer to grow to their final size due to sub-optimal feeding, they are more at risk from disease etc. Two such risks are sea lice and algal blooms (in 2016 alone algal blooms cost the industry nearly $1 Bn). These risks can be reduced significantly by shortening the time spent by fish in the cages.

On the other hand, supplying more feed than the fish can consume will reduce operating margins due to the resulting waste of feed and the cost implications of this. Since feed contributes around 50% of the cost of raising farmed fish, a poor feed conversion ratio can contribute a significant cost (it has been estimated that even an experienced farmer wastes up to 7% of feed). Reducing the amount of waste will have environmental benefits as well as economic ones. Farmers thus seek to feed the fish as much as possible to accelerate growth but have to balance this against wasting feed through the implementation of effective feeding strategies, that is by utilising pre-processed information to improve the feeding algorithm and/or decision-making model.

Figure 1:
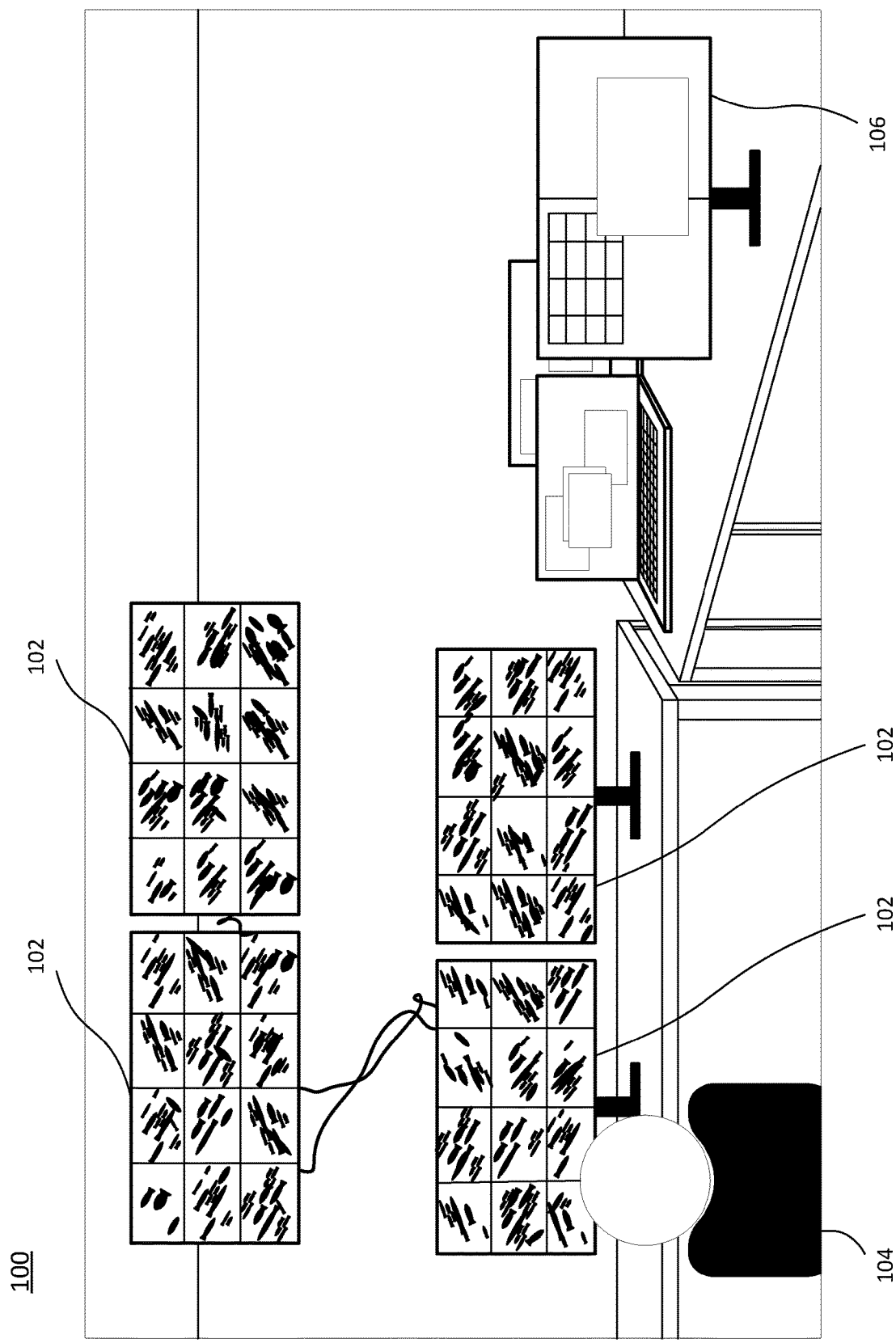
FIG. 1 shows a typical control room for a fish farm.

Presently, farmed fish are kept in cages in the sea (although some, or aspects of, embodiments are equally applicable to fish farming in dedicated tanks) and various monitoring of the fishes' conditions is performed via video cameras and environmental sensors. This monitoring is displayed to the farmer via a control room such as shown in FIG. 1. FIG. 1 shows an operator (farmer) confronted with a number of video monitors showing the activity in the various cages of the farm. The operator will typically also have remote control of the quantity and rate of feed applied to each of the cages. In sending data to operators, and in order to optimise and tailor feeding strategies for cages and farms, remote management may be enhanced by one or more artificial intelligence (AI) arrangements breaking down important pieces of information, which may include which cages to focus on if certain cages are not meeting forecasts.

This monitoring is displayed to a farmer or operator typically via screens provided in a control room such as shown in FIG. 1. In the example shown in FIG. 1, a control room 100 is shown with a human operator 104 positioned to be able to view four display screens 102 which are displaying the fish in each of a number of cages for the human operator 104 to be able to view. The control room 100 is also provided with a computer 106 to allow the operator 104 to be able to control aspects of the fish farm such as the pellet feeding machinery etc.

Based on cage and/or farm monitoring, operators may be capable of modifying their feeding strategy manually, for example instructing the system to provide fewer feed pellets when a low feed conversion ratio is determined. In some embodiments, such instruction(s) may be determined automatically based on forecasts.

Figure 2:
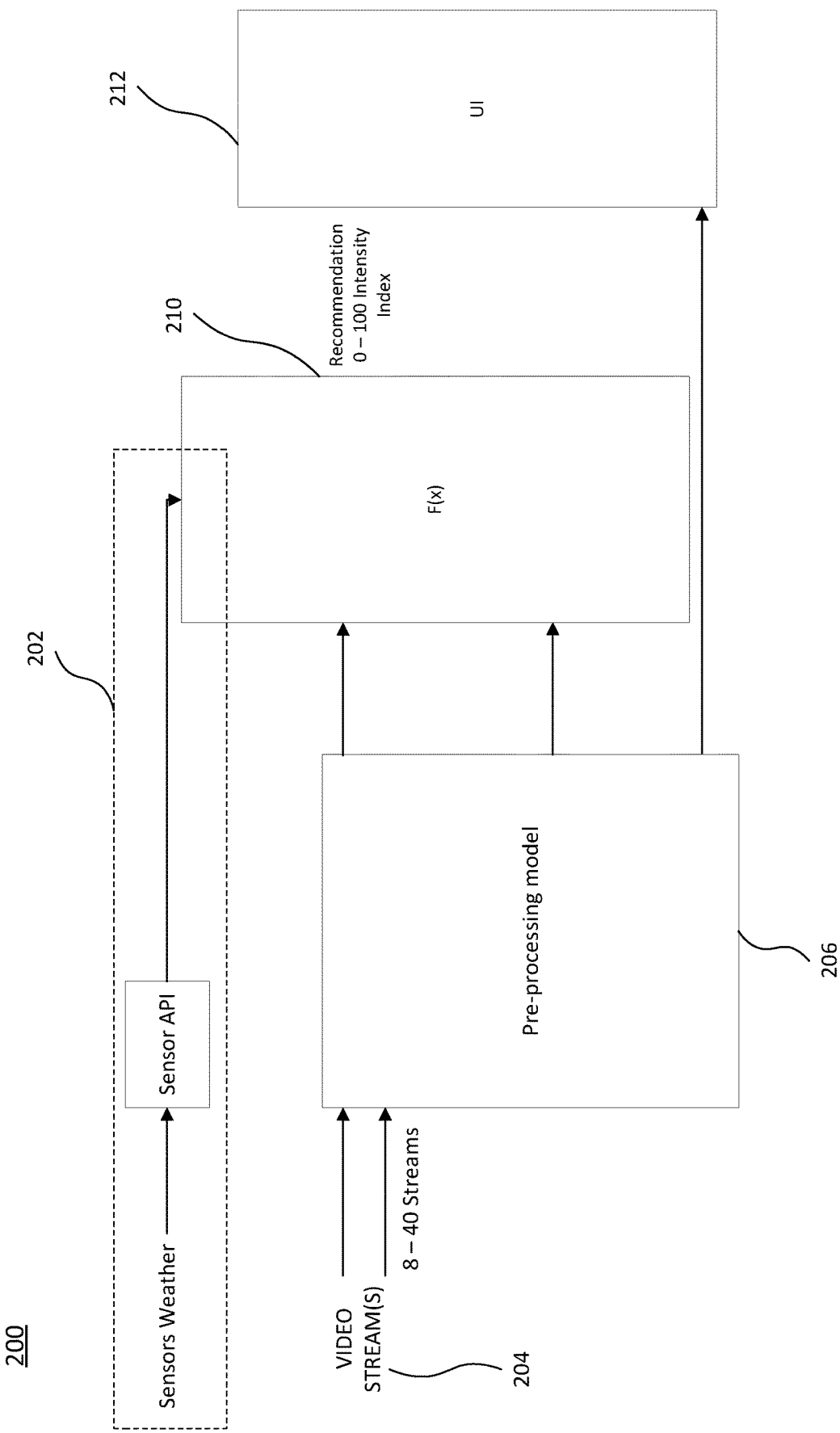
FIG. 2 shows a block schematic diagram of an example embodiment.

FIG. 2 shows a block schematic diagram 200 of an embodiment that analyses the behaviour of the aquatic animals and derives the appropriate feed amounts and rates which may be communicated to the farmer via a user interface 212 or automatically implemented where remote control of the food supply is available. Video streams 204 may be obtained, time-based extraction may be implemented and data input into a computer vision module which pre-processes and analyses the behaviour of the aquatic animals in one or more pre-processing models 206. In addition, in order to maintain a substantially optimal feeding strategy, it is preferred that further data is supplied to the algorithm such as environmental data (for example, a Weather Sensor is provided in the embodiment shown in FIG. 2, which shows how the sensor data is processed 212, where the sensor data being output from the sensor is input into a sensor API and then input into a decision-making module 210) including water temperature and dissolved oxygen content.

Environmental factors may also impact farming strategies especially during adverse conditions. For example, higher water temperatures lead to increased growth from food and hence desirable to feed more while lower dissolved oxygen content leads to farmers decreasing amounts of feed. Therefore, there is a need for systems to take environmental factors into account as part of auxiliary data when determining and substantially optimising for factors such as fish growth.

In further examples, environmental factors may include water current, wind which can be taken into account as feed blown away/feed that actually gets eaten can impact strategies during adverse conditions.

Decision-Making Model Overview:

In the described embodiments, a learned function broadly comprises two parts:
1) one or more pre-processing mathematical and/or neural network models; and
2) one or more decision making models which further responds to the vision/sensor based auxiliary data.

Figure 3:
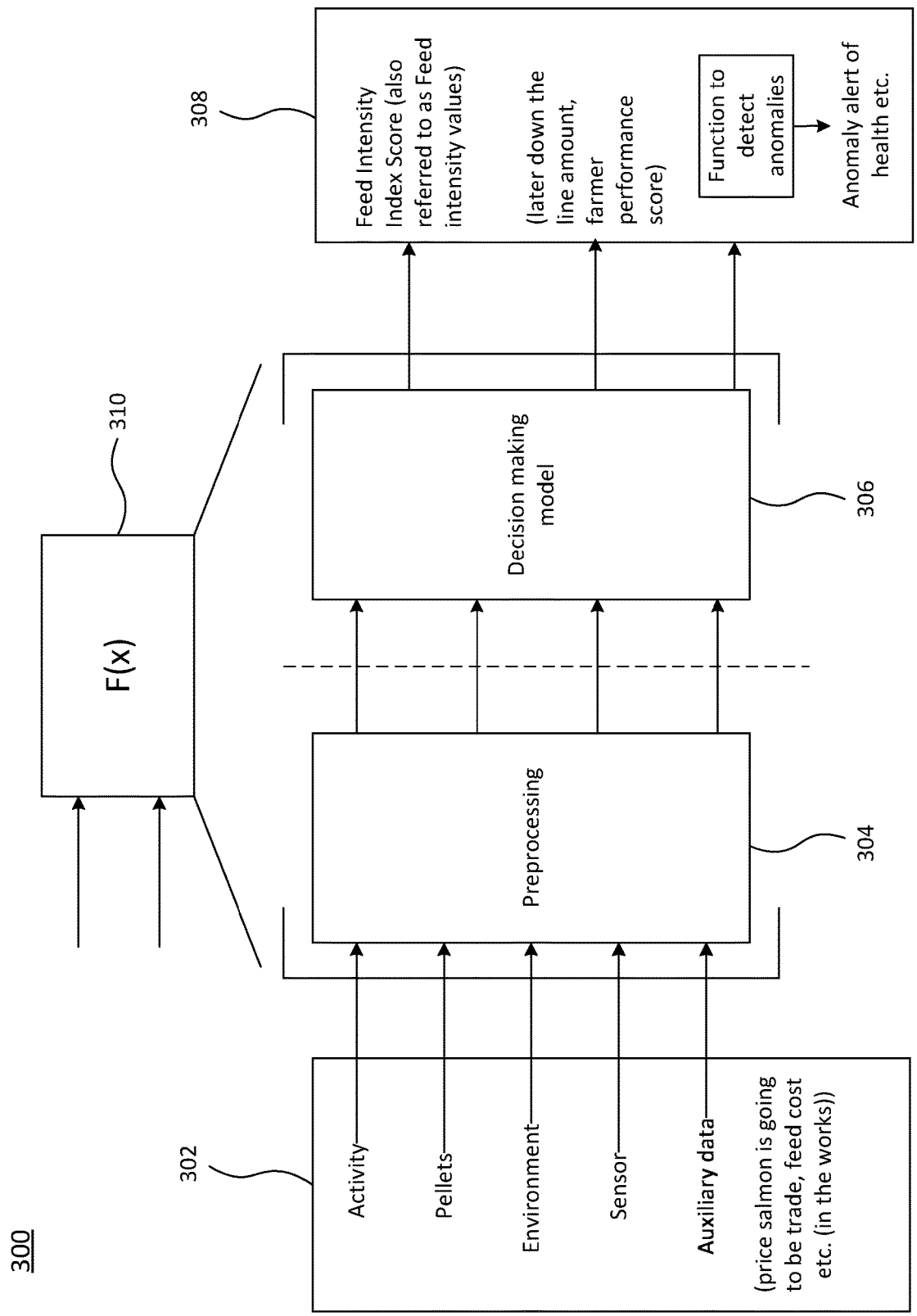
FIG. 3 shows a block schematic diagram illustrating further detail of part of the example embodiment.

FIG. 3 shows a more detailed view of the performance of the one or more learned functions 310. A number of inputs 302 are provided into the pre-processing module 304 including data inputs relating to any or any combination of: (fish) activity, pellets, environment, sensor(s) and auxiliary data. These inputs 302 are inputted into one or more pre-processing modules 304 which may include any or any combination of: growth models, biological models and time series analysis.

The one or more pre-processing models 304 may comprise models arranged to perform any of, or any combination of, the following tasks: derive the amount of food required; estimate growth of the fish from environmental factors such as temperature and dissolved oxygen, feed which is input into the cage/farm, as well as from fish genetics such as fish size, biomass and/or fish age; calculate the time before harvest; calculate forecasts for growth of sea lice/algae blooms; and/or calculate required treatment levels. In the immediate term, this provides a "Feed Intensity Index Score" to the farmer/operator as feedback on how to feed the fish. In the longer term, farmer feedback is provided and taken together with a simple linear regression analysis to derive improvements to the decision-making model 306. In some embodiments, reinforcement learning on the learned function feedback loop (or through the use of iterative learning to optimise a control loop) may be used to identify individual cage behaviour. Each cage may behave slightly differently, and so it can be advantageous for a model to learn based on the individual inputs provided. This may be implemented in a number of different ways. The decision-making model 306 may comprise models arranged to provide outputs 308 such as to: derive a feed intensity score, health anomaly detection, farmer performance score, the amount of food required; derive the amount of food required; estimate growth of the fish from environmental factors such as temperature and dissolved oxygen, feed which is input into the cage/farm, as well as from fish genetics such as fish size, biomass and/or fish age; calculate the time before harvest; calculate forecasts for growth of sea lice/algae blooms; and/or calculate required treatment levels. These outputs may be viewed by the operator via a user interface.

Figure 3A:
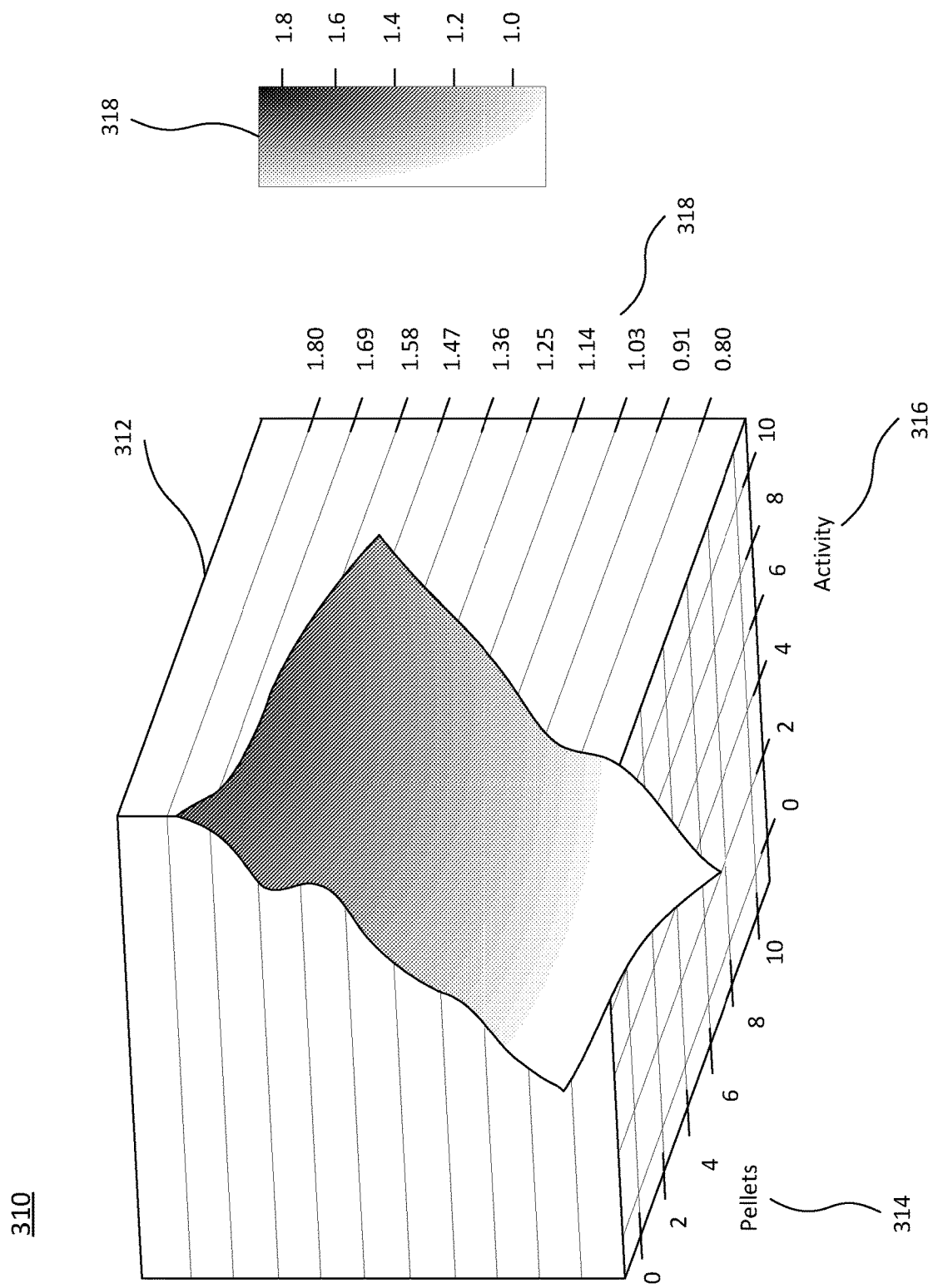
FIG. 3*a* shows an example visual representation of the local F(X) model scaled to three dimensions.

FIG. 3a shows a three-dimensional graph including an unscaled feed intensity score index 318. In an example embodiment, a heat map 312 may be generated displaying a three-dimensional graph of feed pellets 314, aquatic animal activity (a generalization of all features related to fish appetite) 316 against an intensity score 318. Although FIG. 3a describes a three-dimensional graph which would indicate two input features (or factors), the learned decision-making model may take into account more than two input features such as to take into account many/all factors which contribute to a substantially optimal decision.

Figure 3B:
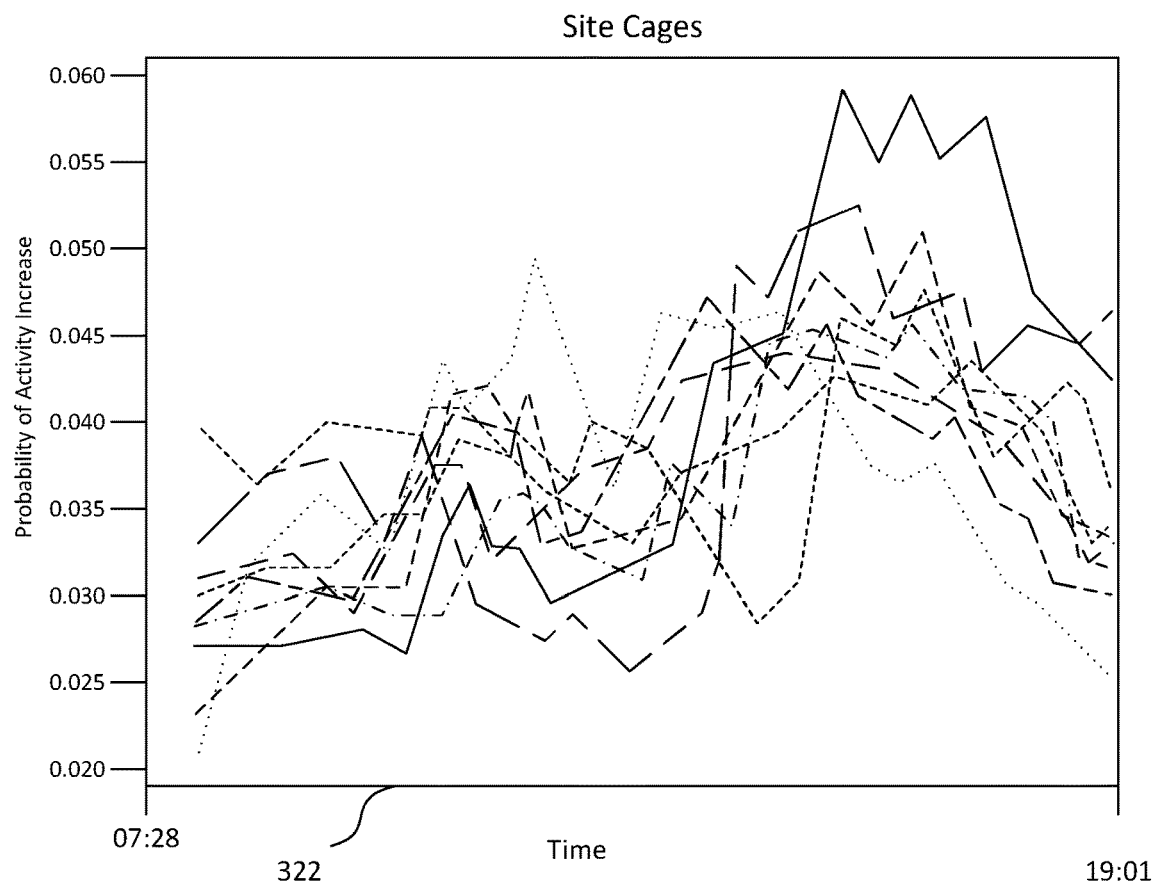
FIGS. 3*b* and 3*c* each shows a representation of fish trends over a period of time.
Figure 3C:
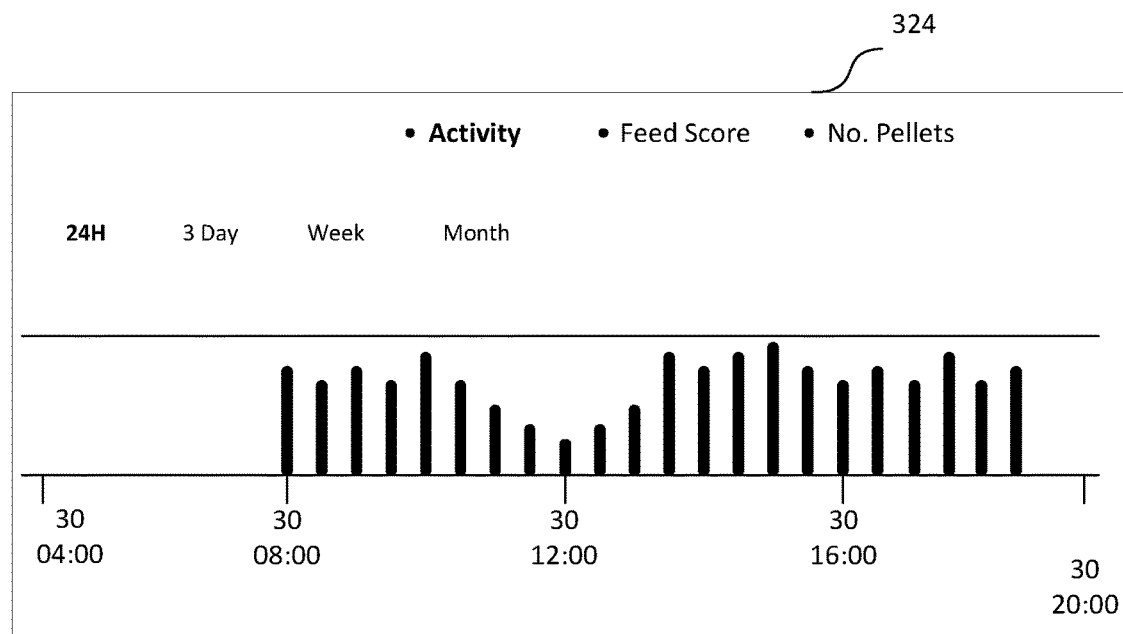

FIGS. 3b and 3c show representations of fish trends over a period of time. For example, in the immediate term, output from one or more learned functions may determine a "Feed Intensity Index Score" (or activity intensity index score) represented as a graph of activity/pellets against time 322 as shown in FIG. 3b; and a bar graph displaying activity/pellets against intensity 324 for site cages as shown in FIG. 3c can be used to assist and/or instruct the farmer in feeding the aquatic animals. In the longer term, farmer feedback can be used together with a simple linear regression analysis to derive improvements to the decision-making model 306.

Time Series Analysis:

In order to understand long term historic behaviours and/or other environmental factors and take this available data into account in strategic farming, time series analysis is performed to integrate into feeding recommendation by taking past data into account. Fish follow activity trends over a period of time, such as their schooling behaviour. This activity may be shown in FIG. 3b for example. Fish may be taught to be fed at a particular time of day which may change depending on the farm. For example, if high level of feeding is recommended at a certain time of day and over several days fish activity is seen to drop at this particular time, it may be recommended not to increase, or to decrease, the level of feeding during this particular time-frame. In the case of repetitive feeding analysis, ARMA filters/models may be utilized in order to obtain substantially useful information. The time series analysis may be pre-processed like any other feature (environmental etc.) and may be mapped to a probability distribution map. Factors may include feed conversion ratio, monthly diseases and/or any other combination of factors such as factors which may have led to previous disease outbreaks.

By dynamically updating the model over a time period, for example individual feeding cycles at orders of magnitude ranging from 2 to 4, a more accurate model may be developed by incorporating new learned information and hence less feed may be wasted in the future. The order of magnitude depends on the predictive time horizon of the feature. For example, estimating when a pellet is seen is a much smaller time horizon (and hence much smaller sliding window training) than estimating the FCR, where datapoints change slow in comparison. So, the time horizon of pellets will be much smaller, but so will the window of data needed for the time-series prediction. FCR will have a longer 'time horizon', but also much more data/larger window is needed for training. Although it may take days to understand patterns of a fish farm, there may be outlying cases where understanding of patterns occurs within a shorter timeframe.

Figure 6:
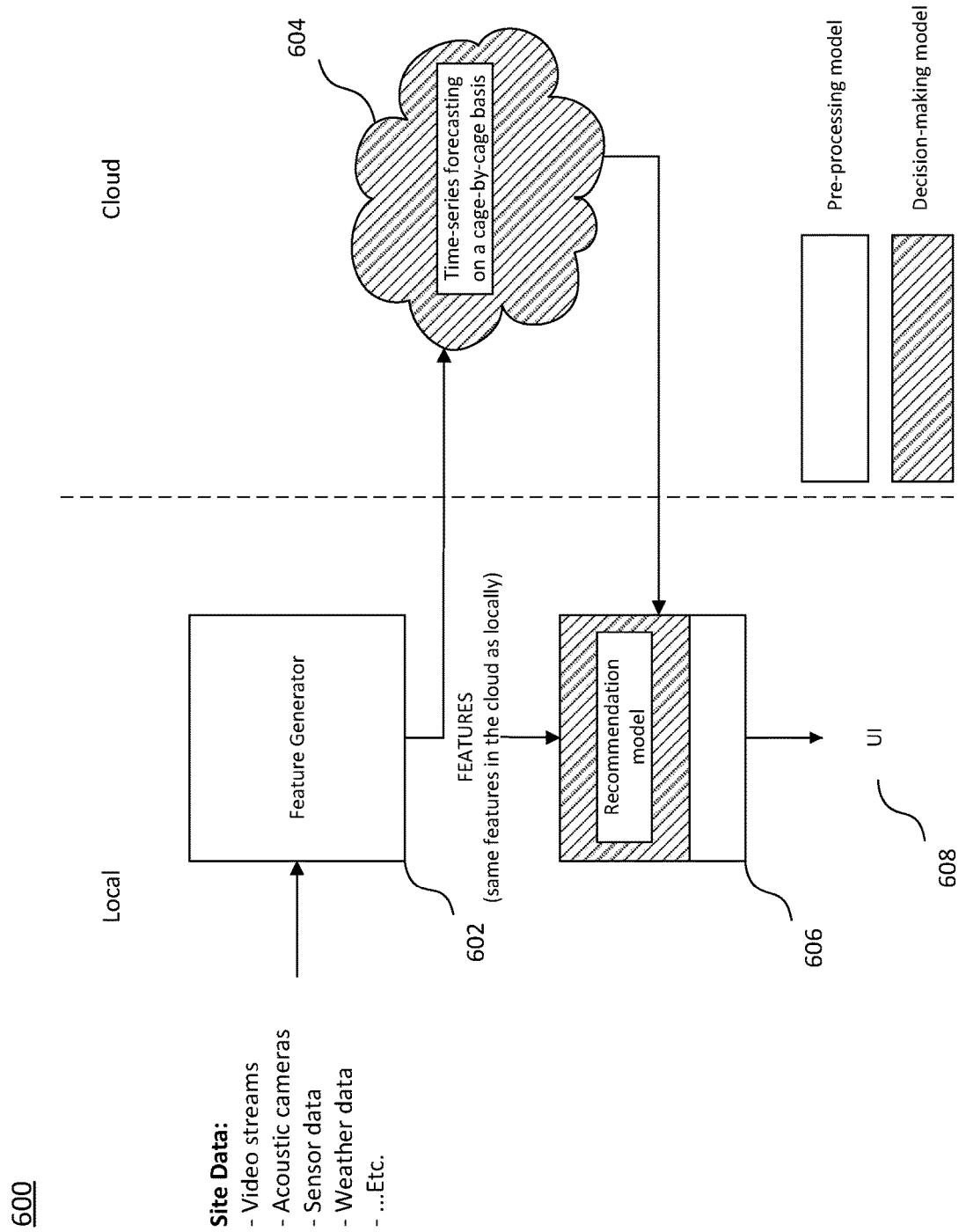
FIG. 6 shows a flow diagram of a system combining one or more pre-processing models and one or more learned decision-making models.

FIG. 6 shows an overview of one or more decision-making models in an example of a combined system working with one or more pre-processing models. The feature generator 602 analyses and pre-processes various data obtained from a fish farm. In this example system, the process of time-series forecasting on a cage-by-cage basis which is carried out by the decision-making model occurs in the cloud. This, in turn, can feed into a local application (i.e. hardware co-located or situated locally to the farm) in generating recommendations 606 to a user via a user interface 608 or an automated farm.

In the present embodiment, activity features and pellet counts are the factors that primarily dominate the learned function(s) F(x). However, as the system is used, more reliable extensions of sensor and vision data such as time-series analysis and related pre-processing outputs, such as feed data from a fed system, biomass and fish mortalities, can be added to the learned function as input into the learned decision-making models. Each introduced feature to the learned function may be put through a mean-normalisation and variance normalisation step. The method by which this normalisation is carried out is considered a hyper parameter of the decision-making model.

In some embodiments, the algorithms used within the time series forecasting phase may consist of a linear model as it can be easily differentiable and linear time-invariant (LTI) control theory may be used. However, random forests, LSTMs etc. may also be implemented in example embodiments.

The output of the neural network for detecting the pellets and fish activity is, in some embodiments, also provided as an input to the learned function(s). In some embodiments, the output data can be used by reinforcement learning algorithms, and thus the decision-making model(s), in order to evaluate and determine how to optimise feeding strategies for farms or individual cages.

Combined Local and Remote System Implementation:

In some embodiments, a local farm computer system/machine may be capable of extracting features from data collected from a fish site and/or stored data about a fish farm. The extracted features can be backed up to a remote computer system (e.g. a cloud-deployed/distributed remote system or remote server) which carries out the above-mentioned time series forecasting algorithms on features such as pellets seen on a user interface or loss in feed conversion ratio, in order to predict 'bad' or ineffective farming practices. The remote/cloud system processes the data and the predictions are fed back into the local machine based locally on a farming site such that the local AI can be capable of warning users of these predictions and even recommend alternate one or more feeding practices to maintain effective and efficient fish development.

Figure 7:
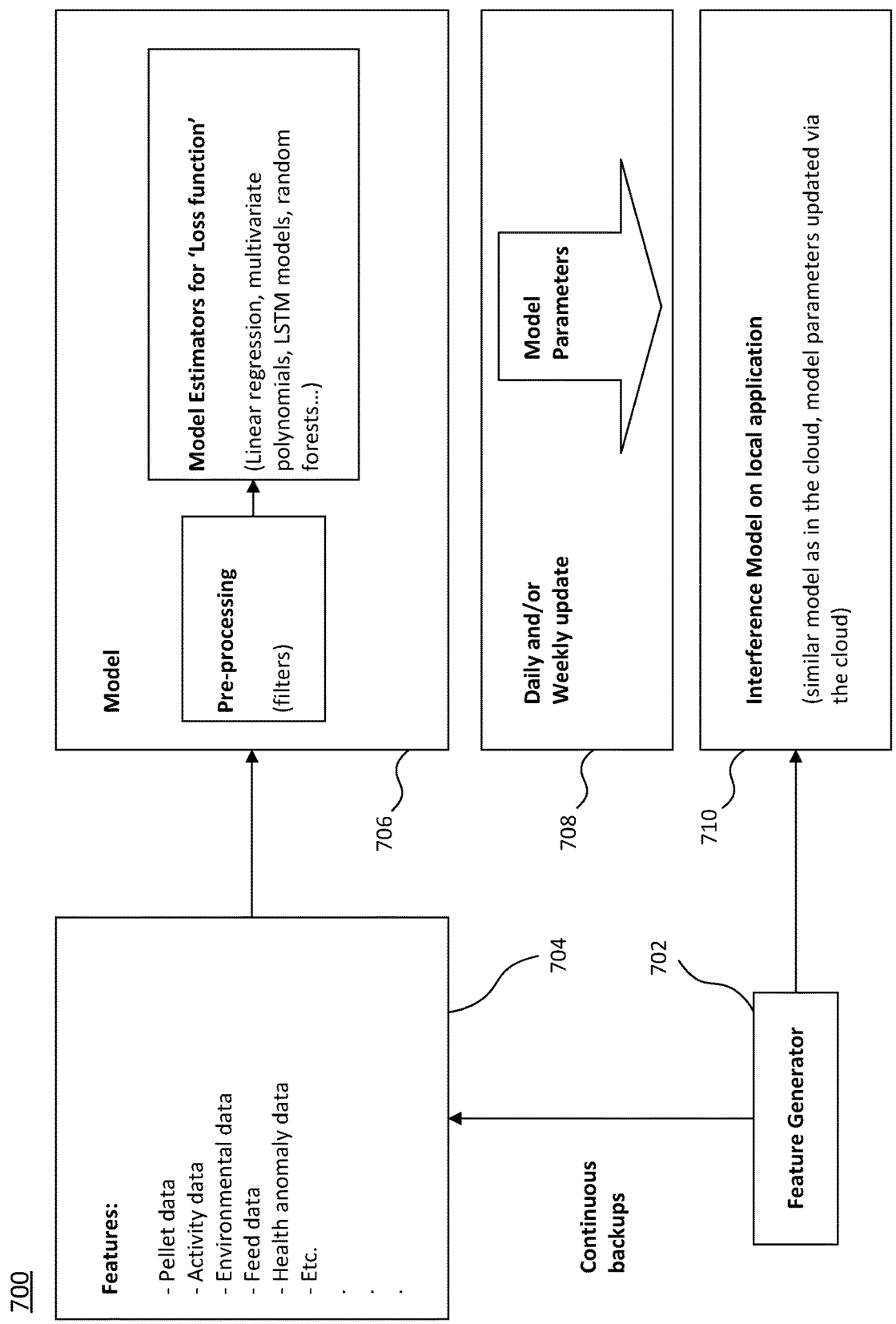
FIG. 7 illustrates the overall structural architecture of the decision-making model which may involve the processing of any feature in relation to the fish.

FIG. 7 shows a feature generator 702 which continuously backs up to a remote system the features 704 collected and extracted locally by one or more pre-processing models. The features are input into one or more learned decision-making models 706 which may consist of a filtering function and model estimators for 'loss function' (linear regression, multivariate polynomials, LSTM models, random forest etc.). The learned decision-making models may be capable of updating data, as shown as 708, on a daily or weekly basis, although other timescales are possible, through the setup of model parameters. In embodiments, an inference model 710 may be implemented as an application local to the farming site. In such inference models, the model parameters would be updated via the cloud.

In an example embodiment, a combination of features 704 backed up continuously in the cloud may include:

1) Activity Features—how close the fish are to the camera, how they are schooling, distance of fish from surface, speed of fish, density of fish, placement of fish within a cage, age of fish, size of fish, sonar and acoustic datapoints. These features are trained as a linear regression of data points from the farm site, and are normalized and scaled into a range 0-10.

2) Pellet Features—the number of pellets identified, the number of waste objects such as fish waste/faeces, and water waste objects such as seaweeds floating etc.

3) Feeding Data—how much food was provided to the fish, when the food was provided, fish biomass, fish mortality rates and reasons for such rates.

4) Auxiliary sensor data—current, tide, wind, pH, sunlight, oxygen, temperature, salinity, turbidity, rain, biomass data, fish mortalities, algae sensor data etc.

All of the immediate processing may be provided by a computer local to the farm. This is often necessary since farms are in isolated locations with poor network connectivity. Typically, the sample frames and recorded data referred to above will be uploaded to the cloud during the night when no feeding is occurring (and there is plenty of time to compensate for the poor data rate). Offline processing may then be conducted in the cloud to improve the learned model.

Estimation:

In some embodiments, a filter may be used to first "smooth" the underlining signals, such as number of fish on the screen, the speed of the fish, and other outputs of the vision system in order to reduce the level of noise within data. An estimator for each signal may be designed so as to 'describe' the state of the world. This could be a combination of an autoregressive moving average filter (ARMA), or other types of moving average filters, with multivariate regression. A custom polynomial or easily differentiable multi-variate ARMA-type model can be fit from obtained substantially real time and/or real time data. From there, within a short period of time, wherein a time horizon is derived on based on the underlining features estimated, a state change matrix may be defined as the first order differential of the input/output signals i.e. namely to put more pellets in or not, with assumptions such that the system is a linear time-invariant, stationary system, and apply linear system control theory in order to maximise pellets given with pellets seen as the loss signal to the system. In order to predict feature signals in fish farming processes and/or effective/ineffective fish farming processes, example models such as LSTM, random forest, RNN, GRU, linear regression model, SVM may also be implemented.

Figure 8:
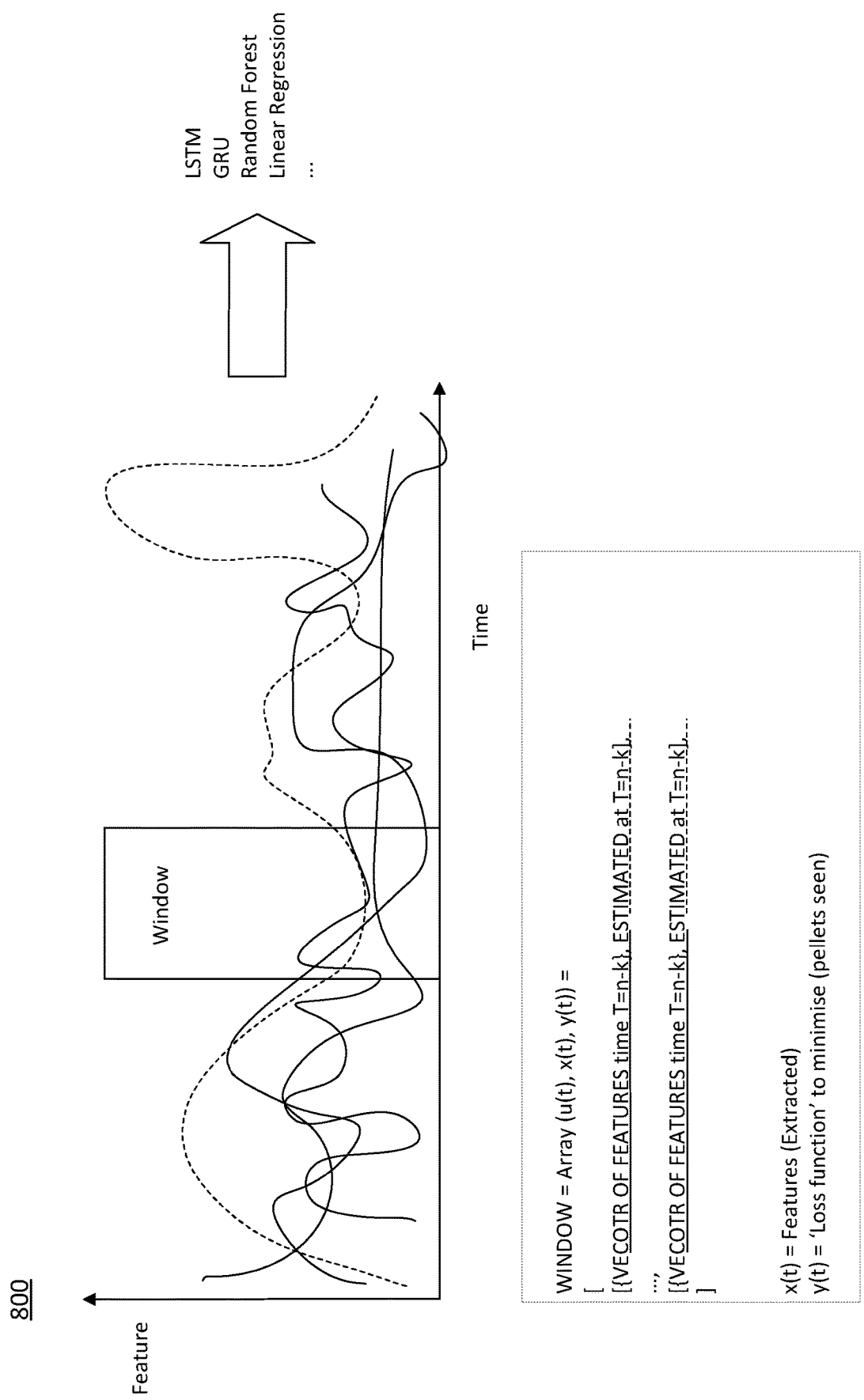
FIG. 8 shows an outline graph of how the decision-making model may be trained.

As shown in FIG. 8, estimators 800 may be trained as a moving windows of data. FIG. 8 shows a time and feature based graph and outlines the algorithm used in training the decision-making model. Data from time k→K is trained in series against the points(s) k+1→K+1, such that the next state can be predicted from one step to the next. The model is trained in the cloud would need to hold a relatively similar format to the local recommendation model on the local machine (F(x)).

For estimation and prediction, any type of machine learning technique may be used in order to build models. Each estimator is a custom model which predict the next 'state'. For example, an LSTM model may be used to predict when pellets come based on the feature vector. However, for predicting how activity will change, an ARMA filter may prove more appropriate. In this way, each feature can have a different model, and the best models are discovered via experimentation. These estimators can then be used to alert farmers in advance of pellets coming etc.

In some embodiment, the decision-making model may be further improved by incorporating further signal processing techniques to define an estimator, such as in the case of implementing an LSTM model for the prediction of pellets, for the next state of the system given an initial state. The outputs of this estimator can then be used to define a controller. The controller can then be used to control the state of the system and so to reduce the number of wasted pellets seen. Defining an estimator, and further defining a controller as part of the decision-making process, can provide a greater range of data and system recommendations for the farmer/operator to work from. In embodiments of partially or fully automated fish farms, the controller may play a vital role in determining the outputs of the one or more learned functions.

Figure 9:
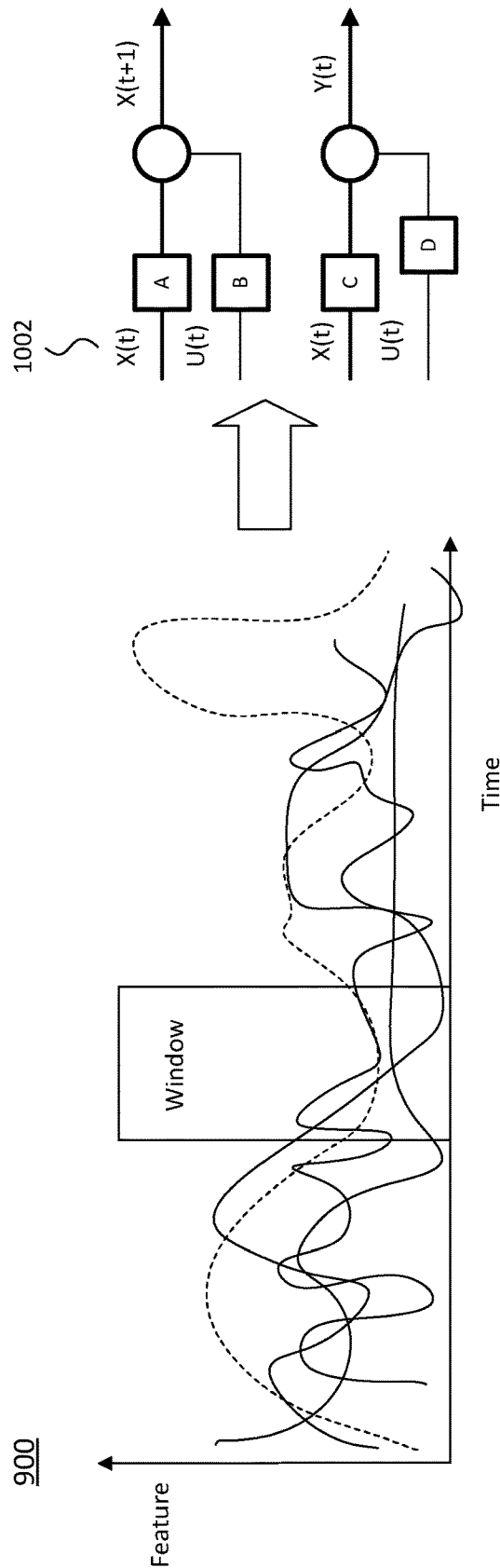
FIG. 9 shows the graph of FIG. 8 modelled as a linear time-invariant system with the application of normal control theory.
Figure 10:
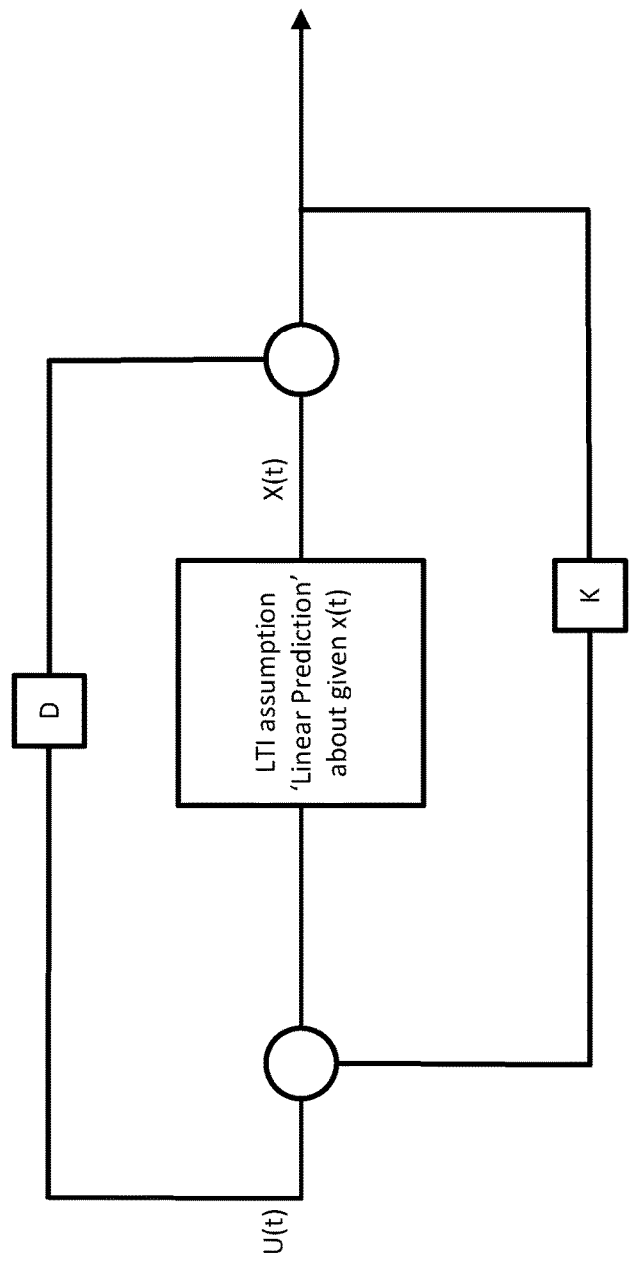
FIG. 10 shows the flow of the decision-making model which is trained in the cloud and run on inference locally on a machine local to the fish farm.

Optimisation:

As shown in FIGS. 9 and 10, the system is then modelled as an LTI (Linear Time-Invariant system) and normal control theory may be applied to the system. In the cloud, matrices A, B, C, as shown as 902, are trained against new and old data, while the matrices are sent back to the local machine for running inference. The model trained in the cloud and running on inference locally on the local machine would then look like 1000 in some embodiments.

In example embodiments similar to that shown in FIG. 10, the z-transform or Laplace transform may be used to describe the linear differential equations in terms of a transfer function H(z). Traditional control theory may be used to reduce the error term of a farm site. The LTI system initial state x(t) may be described via the feature vector extracted, such as number of fish in the camera, the distance from farm surface, number of pellets ( . . . all the features). Inputs u(t) to the system is the amount of food inputted into the water, described as kg per minute. The variable to be controlled y(t) is dependent on the loss function of the farm site—for example, the number of pellets seen on the screen, feed conversion ratio and/or standard growth rate depending on data provided from farm site, as well as the model efficacy for farm site.

Reinforcement learning in this case may require building a simulator that describes the 'search space'. In embodiments, given the dataset size and dimensionality, it is likely that a random forest, LSTM, or SVM model(s) is/are implemented in order to determine the estimator model. Normally machine learning techniques such as the above are much faster to build, much less complex when the dimensionality is high, and the dataset is large. However, these techniques do not create a model that can be differentiable, and hence calculus cannot be used for controller design. Controller design will then best be done via unsupervised learning processes such as reinforcement learning, where essentially the model which is trained on the obtained data will act as a simulator for the reinforcement learning process to explore the "space".

A reinforcement learning (RL) algorithm is confined by the search space from the model estimators described above. There are heuristic functions which essentially "punish" or "reward" the model and/or algorithms based on factors processed. In some embodiments, the reward function is set as a function(s) or model(s) relating to fish growth, and a loss function relating to the number of pellets seen or negative/suboptimal growth of the fish. By using unsupervised RL algorithms, feeding recommendation can be tailored and modified to each individual fish cage on a farm site. This decision making/learning may be performed in the cloud in further embodiments.

For example, presently activity features and pellet counts are processed through another custom pre-processing function to scale the number to a value between 0 and 10. This function may be linear or, in some embodiments, more intricate. The pre-processing function used in the described embodiment may change/develop accordingly as more features from previous processing is inputted into and incorporated by the learned function. The learned function uses a typical reinforcement learning approach, with a probabilistic model prior defined as the base model. In the present embodiment, this prior consists of a set of gaussian distribution vectors for each feature, where the mean and variance are a hyperparameter closely related to the pre-processing function for set features. The reinforcement model is then trained to update a prior distribution according to a loss function. The loss function may comprise various factors such as the number of pellets seen on the screen, the feed conversion ratio of the site, fish mortalities, and other negative indicators of fish growth. Through pre-processing functions, the mean is set to be approximately half in order to maintain control of the system's ability to recommend both when to cease feeding as well as when to increase the amount of feed. This is normalised and displayed to the farmer as an output and also may be provided directly to a feed system once a decision is made. The loss function can reduce the variance of the exploration path for the learning model as the learned function converges to substantially optimal feeding strategies. On top of which, each input feature requires a unique function which serves to normalize the input data to the decision-making model.

In some embodiments, one or more learned functions are present, which each incorporate one or more pre-processing models and one or more decision making models, and form a continuously learning algorithm seeking to optimise feeding strategy for fish farms. The learned function is a maximum likelihood function which essentially provides feeding recommendations to the farmer/operator. In embodiments operable to function as part of a fully-automated farm, the output of the one or more learned functions would cause the feeding equipment to place feed in the respective cages and/or farms. One or more learned functions may comprise of one or more models or algorithms which assist with pre-processing of data as well as decision making using the pre-processed data. The pre-processing models and/or algorithms may generate, in real-time or substantially real-time, a set of useful features by breaking down data-streams which may be taken into account by the decision-making models and/or algorithms which learn over time how one or more features relate to fish growth, fish presence and feed/waste etc. The various features which are put through the decision-making models and/or algorithms may be reasoned, shown to operators via a user interface and provided as input to the decision-making model(s) for further optimisation of feeding strategy as historical data.

Offline or remote processing of saved data may be used to determine improvements to the algorithm. This could be done offsite or locally, perhaps during the night when there is no actually feeding occurring. Optionally, sample images and all of the collected environmental and feeding data are uploaded to a remote processing arrangement into a dataset that is used to derive improvements in the learned algorithm. A key component of this processing is the time taken for the fish to reach a predetermined weight. The weight may be determined by the weight at which the fish can first be sold. It can be economically beneficial for a farmer for the fish to reach this weight as quickly as possible and with the least feed usage. Farmers may take more risk by possibly optimising standard growth rate vs feed conversion ratio in order to reach optimal weight of fish. Depending on the farming strategy farmers wish to carry out, based on recommendations provided by the system and/or automatic implementation of certain procedures depending on a determined substantially optimal feeding/farming strategy, cages and farms can be looked after effectively and efficiently. In embodiments the dynamic training of F(x) may take place in the cloud while F(x) runs inference and provides data locally via applications situated locally by the farm site(s).

The inference function on the local machine must be of similar model to the model trained in the cloud. In such a case where an LTI model is present in the cloud, the local version of the system may be updated by communicating the weights. In the case where an LTI model is not present in the cloud, but rather an LSTM model for pellet prediction, and an ARMA filter for activity prediction, then locally there must be an LSTM model for pellet prediction, and an ARMA filter for activity prediction present also.

In determining a substantially optimal farming strategy for a particular farm site, the amount of feed provided to the fish is as important as environmental conditions and the economic and biological feed conversion ratio. The economic aspect may essentially be a function of feed provided per kilogram of biomass growth and the biological aspect takes into account the mortality difference within calculations. Therefore, original data of feed, biomass growth or mortalities and even the type of treatment used for illness may all be fed into the learned decision-making model(s) so users can optimise a loss function to what is predefined.

Anomaly Detection:

On top of pellet data, fish activity data and environmental data, health monitoring and detecting health anomalies at early stages can play a vital role in fish farming in general and can also impact how to determine fish feeding strategies. In order to ascertain anomalies within fish cages/farms, features similar to that used in an optimisation algorithm may be implemented in an anomaly detection model/algorithm. Anomalies, for example, may include factors relating to oncoming diseases and/or high sea lice count over time. Using AI/ML approaches, anomaly detection algorithms may be provided in the form of unsupervised learning tasks executed from the structuring of various data. By looking at trends in data and analysing past historic data, as well as real-time data, factors relating to health hazards can be determined and mitigated within an optimised strategic fish farming environment.

In some embodiments, features extracted by a pre-processing model may be utilised by an anomaly detection algorithm embedded within the decision-making algorithm. The anomaly detection can undergo calculation in the cloud and run over the upcoming data in order to determine, on a cage by cage basis, if the data streaming up is consistent, or 'normal', with respect to previous and/or stored data. If the upcoming data is sufficiently outside or an outlier of the 'normal' dataset, an alert ay be triggered to the farmer or user of the system, letting them know that the cage is not behaving normally or effectively in terms of farming.

Figure 4:
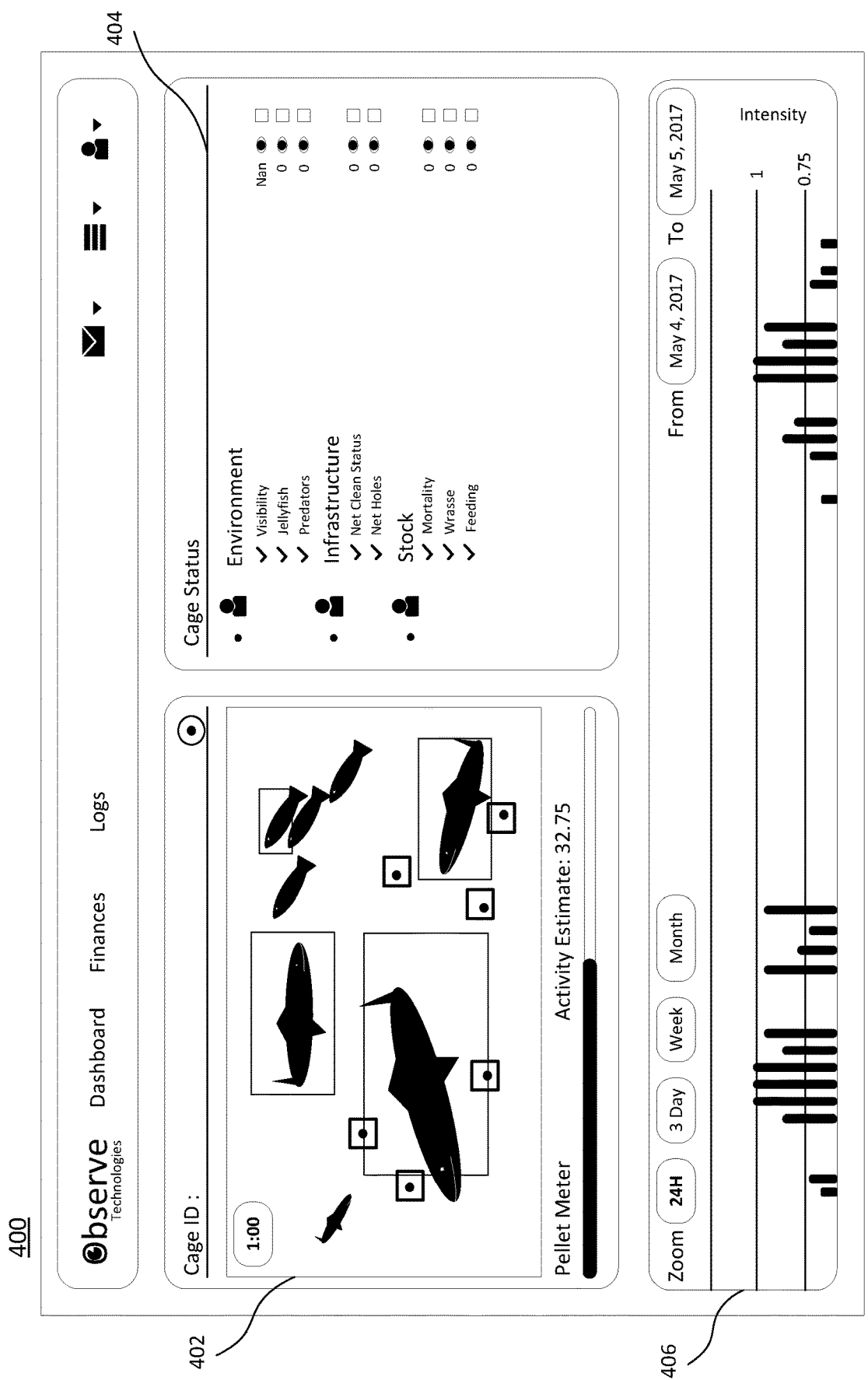
FIG. 4 shows a user interface illustrating feed waste detection.
Figure 5:
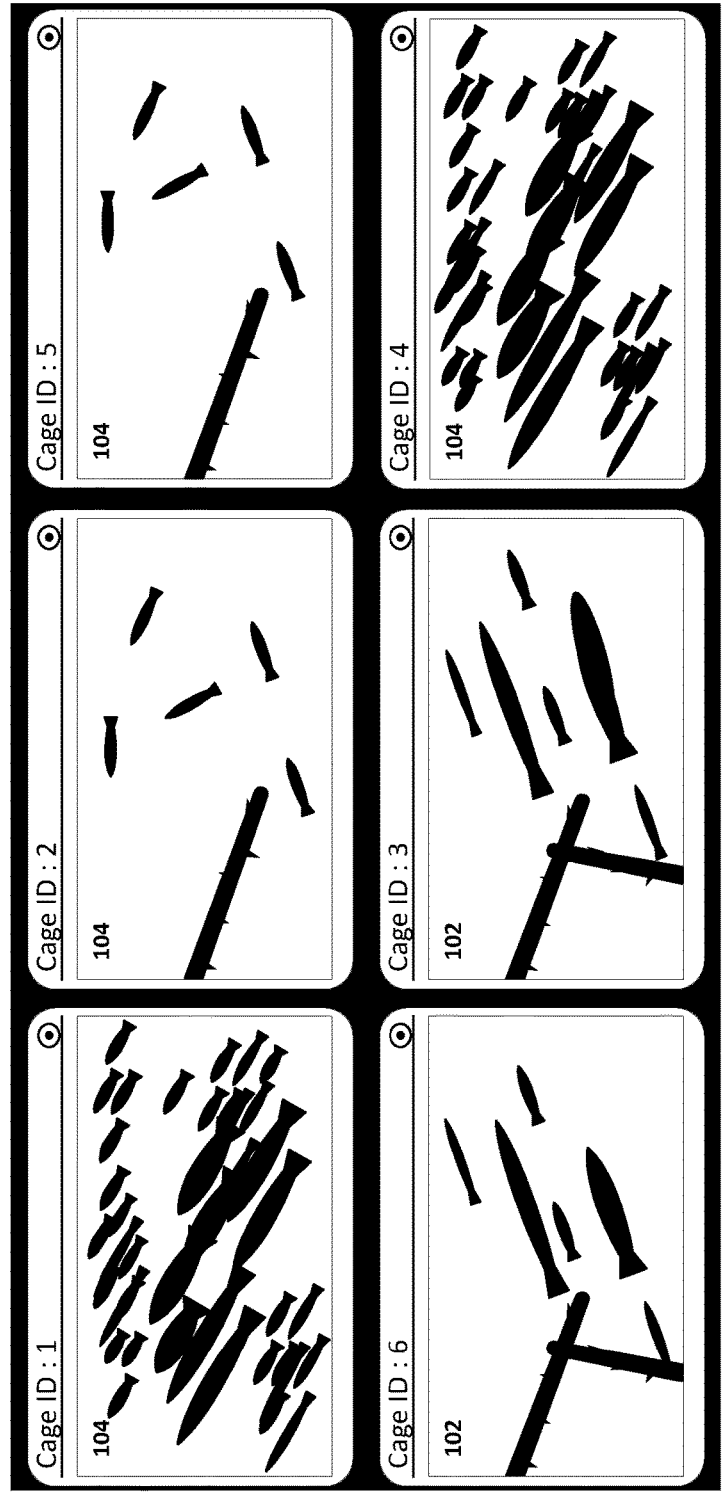
FIG. 5 shows a further example of a user interface.

User Interface:

The location of pellets may be shown to an operator via a user interface (UI) as shown in FIG. 4 and FIG. 5. The UI may display a range of relevant information, for example details regarding the health/wellness of the fish, the number of different species of aquatic life detected, the cleanliness of the fish farm environment, and the status of any nets or barriers used to protect and/or separate the fish being farmed.

FIG. 4 shows a user interface 400 illustrating feed waste detection alongside fish activity data. In an example user interface, there may be shown a view of a cage 402, the status of that particular cage 404 and a time-based graph in relation to intensity of activity within and/or feed pellet detections within the cage 406. The user interface 400 may provide a particular cage ID, current time and an estimate of the level of activity regarding the visual real time image of a cage in view along with a view of the cage overlaid with segmentation data in relation to detected objects. The user interface may be further capable of indicating the classification of detected/segmented objects, such as to distinguish pellets, aquatic animals, wasted feed pellets and other waste. The user interface 400 may also be capable of providing information, whether textually, visually or graphically, information about the cage being viewed such as environment visibility, presence of unwanted aquatic animals, infrastructure, stock and the number of deceased aquatic animals.

In some embodiments, the user interface 400 may also provide the user with "good"/"bad" feed pellet detection with depth analysis in relation to feed pellets. In determining the depth at which a feed pellet is located, depending on various features in relation to fish feeding/farming, the user may be notified that seeing pellets at a certain depth may be considered "bad". However, seeing pellets at for example one meter from the surface is not considered to be "bad".

FIG. 5 shows a further example of a user interface 500 which provides a view from six separate image sensors. Depending on available hardware, the or more image outputs may be viewed for the same cage depending on user preference and/or requirement.

In addition, processing may be prioritised by giving higher priority to, and processing more urgently, the processing of video feeds from higher priority cages (rather than processing all cages in order of receipt of the video feed data).

Although the decision-making model aims to provide recommendations on a UI, the decision-making model may also feed recommendations directly to the feeding equipment in place for the cage(s) and/or farm(s) or perhaps task robotic net cleaners to automatically clean cages.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

Although this invention is focused on open sea cages, activity and feed factors may be also analysed in indoor fish farms. However, in indoor fish farms, one or more variables may be controllable, e.g. oxygen level, lighting, and/or temperature.

The invention claimed is:

1. A computer-implemented method for feeding one or more aquatic animals, the method comprising:
   receiving, from a first system, sensor data pre-processed using a first model on the first system, the sensor data in relation to the one or more aquatic animals, at a second system;
   inputting the sensor data into one or more learned decision-making models on the second system, wherein the one or more learned decision-making models has been trained to substantially optimise the rate and amount of food provided to the one or more aquatic animals;
   determining model parameters using the one or more learned decision-making models using the received sensor data; and
   outputting the model parameters from the second system to the first system, wherein the model parameters are operable to be used by a second model on the first system.

2. The method of claim 1, wherein the sensor data comprises any or any combination of: one or more extracted features; one or more activity features; one or more pellet features; feeding data; and/or auxiliary sensor data.

3. The method of claim 1, wherein the feeding of the one or more aquatic animals takes place in one or more cages and/or one or more aquatic animal farms.

4. The method of claim 1, wherein the one or more learned decision-making models comprises one or more loss and/or reward functions:
   wherein the one or more loss/reward function minimises/maximises one or more signals, wherein the one or more signals comprises pre-processed sensor data; and/or
   wherein a gaussian distributed model and/or a linearly distributed model is used prior to the use of a loss/reward function; and/or
   wherein the one or more signals comprises: image data; video data; acoustic data; sonar data; light data; biomass data; environmental data; stereo vision data; acoustic camera data; and/or fish activity data; and/or
   wherein said pre-processed sensor data comprises any or a combination of: fish type; feed type; past and present feed conversion ratio; biological feed conversion ratio; economical feed conversion ratio; past and present standard growth rate; past and present specific growth rate; mortality data; feed input data comprising amount and/or rate and/or intensity; and/or
   wherein said fish activity data comprises any or a combination of: reaction of fish towards feed; fish schooling data; surface feeding activity; fish density; fish speed; and/or distance of fish from sensors; dissolved oxygen level; state of the tide; pH of the water; visibility through the water; intensity of light incident on the water; biomass data; mass of feed being consumed; air and/or water temperature; sunlight; cleanliness of water; salinity; saturation; rainfall; tide level; state of nets; treatments; sea lice count; oxygen input data; current or wind data; fish genetic data; metabolic rate; sound of fish eating; sound of fish moving; and/or fish vaccination.

5. The method of claim 1, wherein the one or more second learned decision-making models comprises one or more temporal feedback loops,
   wherein the one or more temporal feedback loops maximises the amount of food put into the cage against a loss function.

6. The method of claim 1, wherein the feeding instructions are generated through correlation analysis of the sensor data comprising one or more analysis in relation to any or any combination of: feed provided to the one or more aquatic animals; activity level of the one or more aquatic animals; wasted feed pellets; live feed data; biomass data; mortality data; treatment data; genetic data; and/or environmental data; wherein the pre-processing of the pre-processed sensor data comprises filtering and/or normalization techniques.

7. The method of claim 6, wherein the correlation analysis is performed using one or more machine learning algorithms comprising
reinforcement learning algorithms, neural networks, linear regression, polynomial regression and/or random forests; and/or
wherein one or more input correlation vectors comprises a normalised mean and a normalised variance; and/or
wherein the correlation analysis is performed using one or more feedback loops, wherein the one or more feedback loops comprises a circular buffer and/or a state buffer; and/or
wherein the normalised mean and the normalised variance are normalised using one or more hyper parameter functions.

8. The method of claim 1, wherein the one or more learned decision-making models further comprises one or more signal processing techniques that include any of a Long Short Term Memory (LSTM) model; a Support Vector Machine (SVM) model; a Gated Recurrent Unit (GRU); linear regression; multivariate regression; polynomial regression; a Recurrent Neural Network (RNN); and/or a random forest model; and
wherein the one or more signal processing techniques is used to build one or more feedback loops.

9. The method of claim 1, wherein the one or more learned decision-making models comprises an estimator model:
wherein the estimator model pre-processes data via a moving average filter;
wherein the estimator model comprises one or more of: an LSTM architecture; an RNN architecture; a GRU architecture; and/or a Random Forest architecture; and/or
wherein the estimator model is modelled via a set of differential equations; and/or
wherein the estimator model is used to predict a signal for a time horizon.

10. The method of claim 1, wherein the one or more learned decision-making models is updated using reinforcement learning techniques and/or time series analysis; wherein the time series analysis considers any one or more of feed score over time, monthly diseases, and/or other combination of factors which led to previous disease outbreaks.

11. The method as claimed in claim 1, wherein the one or more learned decision-making models further outputs one or more predictions comprising any one or more of: oncoming of pellets; activity; schooling; distance of the one or more aquatic animals from the camera; speed of the one or more aquatic animals, overfeeding; and/or underfeeding,
wherein each of the one or more predictions comprises one or more potential loss candidates; and/or
wherein the one or more predictions is dependent on a time horizon of the one or more potential loss candidates.

12. The method of claim 1, wherein the one or more learned decision-making models further comprises an anomaly detection algorithm; wherein the anomaly detection algorithm takes into account factors relating to oncoming diseases, historic health data, and/or high sea lice count over time.

13. The method of claim 1, wherein the one or more learned decision-making models is updated over a time period and/or arranged to continuously learn in real time; wherein the one or more learned decision-making models is arranged to continuously learn in real time through on-site strategies and/or cloud learning strategies.

14. The method of claim 1, further comprising:
showing data regarding the one or more aquatic animals to an operator via a user interface;
wherein the user interface is operable to display any or any combination of: feed intensity score; feed pellets not consumed by the one or more aquatic animals; a derived amount of feed; a rate at which feed should be provided; feeding pellets not consumed; feed conversion rate; biomass; animal mortality; animal growth; instructing placement of a derived amount of feed; and/or animal activity.

15. The method of claim 14, wherein instructing placement of the derived amount of feed comprises displaying the amount on a user interface
or instructing placement directly to a control feed apparatus and/or other automatic controls.

16. The method of claim 1, wherein determining the amount of food to be provided to the one or more aquatic animals comprises deriving a rate at which the feed should be provided.

17. The method of claim 1, further comprising:
triggering an alarm in response to a detection of one or more of: overfeeding, underfeeding; detected levels of dissolved oxygen dropping; the presence of other species of animal in the confined space; schooling; oncoming of pellets; detected health anomalies; and/or detected net holes.

18. An apparatus operable to perform the method of claim 1:
wherein the one or more learned decision-making models are substantially implemented on a graphical processing unit; and/or
wherein the method is performed substantially locally to where the one or more aquatic animals are located; and/or
wherein the apparatus comprises any or any combination of: an input; a memory; a processor; and an output.

19. A system operable to perform the method of claim 1; wherein the system is operable to instruct placement of feed by signalling to a feed distribution apparatus.

* * * * *